United States Patent
Kyu et al.

(10) Patent No.: US 9,548,514 B2
(45) Date of Patent: Jan. 17, 2017

(54) STRETCHABLE, SOLVENT FREE, COMPLETELY AMORPHOUS SOLID ELECTROLYTE FILMS

(71) Applicants: Thein Kyu, Akron, OH (US); Mauricio Echeverri, Akron, OH (US)

(72) Inventors: Thein Kyu, Akron, OH (US); Mauricio Echeverri, Akron, OH (US)

(73) Assignee: The University of Akron, Akron, OH (US)

( * ) Notice: Subject to any disclaimer, the term of this patent is extended or adjusted under 35 U.S.C. 154(b) by 177 days.

(21) Appl. No.: 14/352,841

(22) PCT Filed: Oct. 22, 2012

(86) PCT No.: PCT/US2012/061266
§ 371 (c)(1),
(2) Date: Apr. 18, 2014

(87) PCT Pub. No.: WO2013/059769
PCT Pub. Date: Apr. 25, 2013

(65) Prior Publication Data
US 2014/0255772 A1    Sep. 11, 2014

Related U.S. Application Data

(60) Provisional application No. 61/549,416, filed on Oct. 20, 2011.

(51) Int. Cl.
| | | |
|---|---|---|
| *H01M 10/04* | (2006.01) | |
| *H01M 10/02* | (2006.01) | |
| *H01M 10/0565* | (2010.01) | |
| *H01M 10/052* | (2010.01) | |

(52) U.S. Cl.
CPC ....... *H01M 10/0565* (2013.01); *H01M 10/052* (2013.01); *H01M 2300/0082* (2013.01); *Y02E 60/122* (2013.01)

(58) Field of Classification Search
CPC ............ H01M 10/052; H01M 10/0565; H01M 10/058; H01M 6/18; C08J 5/22; C08L 71/00
See application file for complete search history.

(56) References Cited

U.S. PATENT DOCUMENTS

| | | | |
|---|---|---|---|
| 6,368,746 B1 * | 4/2002 | Takada | H01M 4/13 252/182.1 |
| 6,953,642 B2 | 10/2005 | Yamamoto et al. | |
| 7,468,226 B2 | 12/2008 | Kwak et al. | |
| 2003/0059681 A1 * | 3/2003 | Noh | H01M 2/0212 429/306 |
| 2005/0196678 A1 | 9/2005 | Yamamoto et al. | |

FOREIGN PATENT DOCUMENTS

WO    WO 94/14828 A2    7/1994

* cited by examiner

*Primary Examiner* — Kenneth Douyette
(74) *Attorney, Agent, or Firm* — Renner Kenner Greive Bobak Taylor & Weber

(57) ABSTRACT

A method of creating an electrolyte film includes mixing succinonitrile (SCN), lithium salt and crosslinkable polyether addition to form an isotropic amorphous mixture; and crosslinking the crosslinkable polyether to form a cured film, wherein the cured film remains amorphous without undergoing polymerization-induced phase separation or crystallization.

19 Claims, 13 Drawing Sheets

STRETCHABLE, SOLVENT FREE, COMPLETELY AMORPHOUS SOLID ELECTROLYTE FILMS

CROSS-REFERENCE TO RELATED FILINGS

The present application claims the benefit of U.S. Provisional Patent Application No. 61/549,416 filed Oct. 20, 2011.

FIELD OF THE INVENTION

The present invention generally relates to electrolytes. More particularly, the present invention relates to solid electrolyte films that are solventless and flexible. In particular embodiments, the present invention relates to lithium salt-based solid electrolyte films.

BACKGROUND OF THE INVENTION

The development of solid electrolytes for polymer lithium batteries has been a major challenge in the energy storage industry. In present lithium battery technology, organic solvents are customarily used as a means of ionizing the ionic lithium salt and concurrently promoting ion transport through polymeric membranes. However, the interaction between the solvents and the electrodes leads to contamination, which in turn reduces the battery shelf-life. Additionally, the organic solvents are contained in metal containers of various shapes, making such batteries heavy and bulky such that significant space is required for intended applications, for instance, in electric vehicles. Moreover, damaged or leaky battery containers can present a safety risk.

As a result, several major efforts have been directed to fabrication of non-volatile conductive membranes, notably polymer gel based electrolytes. The conventional polymer electrolyte utilized poly(ethylene oxide) (PEO) as a matrix, but the room temperature ionic conductivity was orders of magnitude lower than the conventional lithium battery containing organic solvents. Recently, researchers demonstrated the feasibility of producing solvent-free solid electrolyte by doping with succinonitrile (SCN) plastic crystals for lithium ion transport. They showed that only a small amount of lithium salt (1 mol %) was needed to achieve reasonably high ionic conductivity—on the order of $10^{-4}$ S cm$^{-1}$— despite the fact that SCN itself is a poor ionic conductor. However, the plastic crystal matrix is a waxy substance without sustainable mechanical integrity thereby preventing its full utilization as solid electrolyte.

Others have attempted to create solvent-free polymeric electrolyte membranes by combining PEO with photo-curable poly(ethylene glycol) dimethacrylate (PEGDMA) (to afford mechanical strength) and SCN (for lithium ion transport). Recently, a respectable room temperature ionic conductivity on the order of $10^{-4}$ S cm$^{-1}$ was achieved with the aid of SCN plastic crystal matrix, the conductivity approaching the level of $10^{-3}$ S cm$^{-1}$ at elevated temperatures higher than 80 C. Although promising, this polymeric electrolyte has to rely on the plastic crystal phase of SCN in the PEO/PEGDMA matrix to achieve both sufficiently high ionic conductivity and mechanical strength.

Indeed, in U.S. Published Patent Application No. 2012/0094187, The present invention depart from this current technology by avoiding the formation of a plastic crystal matrix, focusing instead on completely amorphous mixtures of crosslinkable polyether/SCN/lithium salt.

SUMMARY OF THE INVENTION

A first embodiment of this invention provides a method of creating an electrolyte film comprising the steps of: mixing succinonitrile (SCN), lithium salt and crosslinkable polyether addition to form an isotropic amorphous mixture; and crosslinking the crosslinkable polyether to form a cured film, wherein the cured film remains amorphous without undergoing polymerization-induced phase separation or crystallization.

A second embodiment provides a method as in the first embodiment, wherein the lithium salt is selected from lithium bis-trifluoromethanesulfonylimide (LiTFSI), lithium bis-perfluoroethylsulfonylimide, lithium tetrafluoroborate, and lithium perchlorate and mixtures thereof.

A third embodiment provides a method as in either the first embodiment or the second embodiment, wherein the crosslinkable polyether addition includes a crosslinkable polyether selected from poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA) and mixtures thereof.

A fourth embodiment provides a method as in any of the first through third embodiments, wherein the crosslinkable polyether has a molecular weight of from 200 or more to 12000 or less.

A fifth embodiment provides a method as in any of the first through fourth embodiments, wherein the crosslinkable polyether has a molecular weight of from 700 or more to 6000.

A sixth embodiment provides a method as in any of the first through fifth embodiments, wherein said step of mixing further includes mixing a crosslinking agent into the amorphous mixture.

A seventh embodiment provides a method as in any of the first through sixth embodiments, wherein the crosslinking agent comprises from 1 weight % or more to 30 weight % or less of the crosslinkable polyether addition.

A eighth embodiment provides a method as in any of the first through seventh embodiments, wherein the crosslinking agent comprises from 8 weight % or more to 12 weight % or less of the crosslinkable polyether addition.

A ninth embodiment provides a method as in any of the first through eighth embodiments, wherein the crosslinking agent is a molecule having multiple crosslinking sites.

A tenth embodiment provides a method as in any of the first through ninth embodiments, wherein the crosslinking agent is selected from trimethylolpropane triacrylate (TMPTA), pentaerythritol triacrylate, trimethylolpropane ethoxylate triacrylate, trimethylolpropane propoxylate triacrylate, glycidyl methacrylate (GMA) and mixtures thereof.

A eleventh embodiment provides a method as in any of the first through tenth embodiments, further comprising the step of mixing an initiator as part of the amorphous mixture.

A twelfth embodiment provides a method as in any of the first through eleventh embodiments, wherein said step of crosslinking includes activating the initiator.

A thirteenth embodiment provides a method as in any of the first through twelfth embodiments, wherein said initiator is a photoinitiator activated by UV light.

A fourteenth embodiment provides a method as in any of the first through thirteenth embodiments, wherein said initiator is a thermal initiator activated by temperature.

A fifteenth embodiment provides a method as in any of the first through fourteenth embodiments, wherein the amorphous mixture is devoid of solvent.

A sixteenth embodiment provides a method as in any of the first through fifteenth embodiments, wherein said step of mixing is carried out in an inert atmosphere.

A seventeenth embodiment provides a method as in any of the first through sixteenth embodiments, wherein said step of crosslinking is carried out in an inert atmosphere.

A eighteenth embodiment provides a method as in any of the first through seventeenth embodiments, wherein the lithium salt is LiTFSI, the crosslinkable polyether addition includes PEGDA, and the amorphous mixture includes from 40 to 50 parts the polyether addition, from 40 to 50 parts SCN, and 30 parts LiTFSI.

A nineteenth embodiment provides a method as in any of the first through eighteenth embodiments, wherein the polyether addition further includes a crosslinking agent, and the crosslinking agent makes up from greater than 0 to 30 wt % or less of the polyether addition.

A twentieth embodiment provides a method as in any of the first through nineteenth embodiments, wherein the crosslinking agent is trimethylolpropane triacrylate (TMPTA) and makes up 10 wt % of the crosslinkable polyether addition, and the amorphous mixture includes 28 parts by weight polyether addition, 42 parts by weight SCN, and 30 parts by weight LiTFSI.

A twenty-first embodiment of this invention provides a solid, stretchable electrolyte comprising: a mixture of succinonitrile (SCN), lithium salt and crosslinkable polyether, wherein the crosslinkable polyether is crosslinked and the mixture is an isotropic amorphous mixture.

A twenty-second embodiment provides an electrolyte as in the twenty-first embodiment, wherein the lithium salt is selected from lithium bis-trifluoromethanesulfonylimide (LiTFSI), lithium bis-perfluoroethylsulfonylimide, lithium tetrafluoroborate, and lithium perchlorate and mixtures thereof.

A twenty-third embodiment provides an electrolyte as in any of the twenty-first through twenty-second embodiments, wherein the crosslinkable polyether addition includes a crosslinkable polyether selected from poly(ethylene glycol) diacrylate (PEGDA), poly(ethylene glycol)dimethacrylate (PEGDMA), poly(propylene glycol) diacrylate (PPGDA), and poly(propylene glycol) dimethacrylate (PPGDMA) and mixtures thereof.

A twenty-fourth embodiment provides an electrolyte as in any of the twenty-first through twenty-third embodiments, wherein the mixture further includes a crosslinking agent that is also crosslinked with the crosslinkable polyether.

A twenty-fifth embodiment provides an electrolyte as in any of the twenty-first through twenty-fourth embodiments, wherein the crosslinking agent is selected from trimethylolpropane triacrylate (TMPTA), pentaerythritol triacrylate, trimethylolpropane ethoxylate triacrylate, trimethylolpropane propoxylate triacrylate, glycidyl methacrylate (GMA) and mixtures thereof.

A twenty-sixth embodiment provides an electrolyte as in any of the twenty-first through twenty-fifth embodiments, wherein the electrolyte is devoid of solvent.

A twenty-seventh embodiment provides an electrolyte as in any of the twenty-first through twenty-sixth embodiments, wherein the lithium salt is LiTFSI, the crosslinkable polyether is PEGDA, and the mixture includes from 40 to 50 parts by weight PEGDA, from 40 to 50 parts by weight SCN, and 30 parts by weight LiTFSI.

A twenty-eighth embodiment provides an electrolyte as in any of the twenty-first through twenty-seventh embodiments, further comprising a crosslinking agent.

A twenty-ninth embodiment provides an electrolyte as in any of the twenty-first through twenty-eighth embodiments, wherein the crosslinking agent is trimethylolpropane triacrylate (TMPTA) and the mixture includes 25.2 parts by weight PEGDA, 2.8 parts by weight TMPTA, 42 parts by weight SCN, and 30 parts by weight LiTFSI.

BRIEF DESCRIPTION OF THE DRAWINGS

FIG. 8(a) a graph of stress strain curves of the photo-cured polymer electrolyte membranes of two different PEGDA/SCN/LiTFSI compositions possessing relatively high ionic conductivity;

FIG. 8(b) is an image of the 21/49/30 PEGDA/SCN/LiTFSI flexible conductive membrane exhibiting excellent optical transparency, characteristics of a completely amorphous phase;

DETAILED DESCRIPTION OF ILLUSTRATIVE EMBODIMENTS

Figure 1:
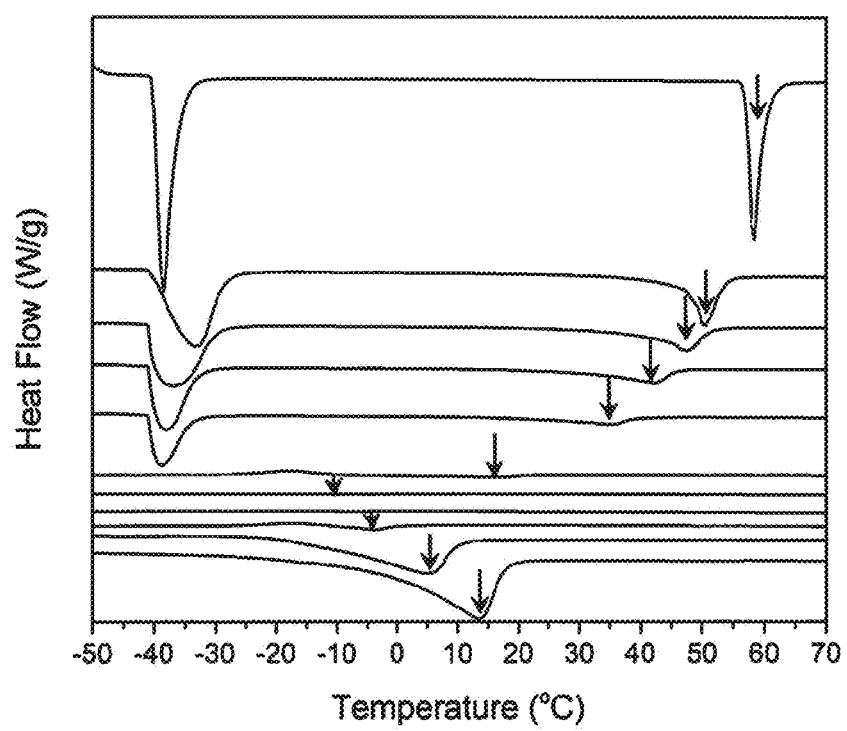
FIG. 1 is a graph showing the Differential Scanning calorimetry of various SCN/PEGDA samples from 100% SCN to 100% PEGDA with increments of 10% shifted vertically.

The present invention provides flexible, solid electrolyte films for electrochemical devices, the electrolyte films formed from isotropic mixtures of a lithium salt, a SCN and a crosslinkable polyether addition. A small amount of initiator may also be part of the mixture, the initiator serving in some embodiments to initiate the crosslinking of the crosslinkable polyether addition to form the electrolyte film. Notable, not only is the mixture isotropic upon initial mixing, it remains isotropic and is completely amorphous after crosslinking of the polyether. This is achieved by judicious selection of the amount of each component employed—lithium salt, SCN and crosslinkable polyether addition. More particularly, the amount of each component is chosen such that the resulting mixture is in the isotopic phase.

In some embodiments, the lithium salt is selected from lithium bis-trifluoromethanesulfonylimide (LiTFSI), lithium bis-perfluoroethylsulfonylimide, lithium tetrafluoroborate, and lithium perchlorate and mixtures thereof.

In a particular embodiment, the lithium salt is LiTFSI.

The crosslinkable polyether addition includes crosslinkable polyether. The crosslinkable polyether is selected based upon having crosslinkable end groups. Virtually any crosslinkable polyether that is able to form an isotropic phase with the SCN and lithium salt, as described below, may be employed. In some embodiments the crosslinkable polyether is selected from poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA) and mixtures thereof.

The crosslinkable polyether may further be chosen based upon its molecular weight. In some embodiments, the crosslinkable polyetherr has a molecular weight of from 200 or more to 12000 or less. In other embodiments, the crosslinkable polyether has a molecular weight of from 400 or more to 8000 or less, in other embodiments, from 700 or more to 6000 or less, and, in yet other embodiments, from 1000 or more to 6000 or less. In some embodiments, the crosslinkable polyether has a molecular weight equal to or greater than 200, in other embodiments, equal to or greater than 400, in other embodiments, equal to or greater than 700, and in yet other embodiments, equal to or greater than 1000, in other embodiments, equal to or greater than 2000, in other embodiments, equal to or greater than 3000. In some embodiments, the crosslinkable polyether has a molecular weight equal to or less than 12000, in other embodiments, equal to or less than 10000, in other embodiments, equal to or less than 8000, and, in yet other embodiments, equal to or less than 6000.

In a particular embodiment, the crosslinkable polyether is PEGDA. In a particular embodiment the PEGDA has a molecular weight of from 250 or more to 6000 or less, in another embodiment, from 700 or more to 6000 or less, and, in yet another embodiment, from 1000 or more to 6000 or less. In some embodiments, the PEGDA has a molecular weight equal to or greater than 250, in other embodiments, equal to or greater than 700, and, in yet other embodiments, equal to or greater than 1000, in other embodiments, equal to or greater than 2000, in other embodiments, equal to or greater than 3000. In some embodiments, the PEGDA has a molecular weight equal to or less than 12000, in other embodiments, equal to or less than 10000, in other embodiments, equal to or less than 8000, and, in yet other embodiments, equal to or less than 6000.

In yet another particular embodiment, the lithium salt is LiTFSI and the polyether is PEGDA.

Because the degree of crosslinking will affect the mechanical properties of the resultant electrolyte film, in some embodiments, the crosslinkable polyether addition will include a small molecule serving as a crosslinking agent to increase the crosslinking density and thus enhance mechanical properties. The crosslinking agent is selected to be multifunctional, meaning each unit of the crosslinking agent will have multiple crosslinking sites. In some embodiments, the crosslinking agent is selected from multifunctional small molecules including trimethylolpropane triacrylate (TMPTA), pentaerythritol triacrylate, trimethylolpropane ethoxylate triacrylate, trimethylolpropane propoxylate triacrylate, glycidyl methacrylate (GMA) and mixtures thereof. The crosslinking agent, as a multifunctional small molecule, will serve as a hub for the extension of polymer chain, thus increasing crosslinking density.

The crosslinking agent may make up from 1 weight % or more to 30 weight % or less of the crosslinkable polyether addition. In other embodiments, the crosslinking agent may make up from 5 weight % or more to 20 weight % or less of the crosslinkable polyether addition, in other embodiments, 7 weight % or more to 15 weight % or less, and, in yet other embodiments, 8 weight % or more to 12 weight % or less. In some embodiments, the crosslinking agent makes up 30% or less of the crosslinkable polyether, in other embodiments, 20% or less, in other embodiments, 15% or less, and in other embodiments, 12% or less (all percentages by weight). In some embodiments, the crosslinking agent makes up 1% or more of the crosslinkable polyether addition, in other embodiments, 5% or more, in other embodiments, 7% or more, and in other embodiments, 8% or more (all percentages by weight).

In a particular embodiment, the crosslinking agent is TMPTA. In a particular embodiment, the crosslinkable polyether includes both PEGDA and the crosslinking agent TMPTA, and the TMPTA is present at from 8 weight % or greater to 12 weight % or less. In a particular embodiment, the TMPTA is present at 10 weight %.

In yet another particular embodiment, the lithium salt is LiTFSI, and the crosslinkable polyether includes PEGDA and the crosslinking agent is TMPTA.

The crosslinkable polyether is ultimately crosslinked to form the flexible, solid electrolyte. Thus, in some embodiments, a small amount of initiator will be employed. The initiator will be chosen based upon the crosslinkable polyether and its ability to initiate the desired crosslinking. In some embodiments, the crosslinking of the crosslinkable polyether is photoinitiated, and in other embodiments, the crosslinking is thermally initiated. In some embodiments, the crosslinking can be both photoinitiated and thermally initiated.

In some embodiments, the initiator is selected from photoinitiators thermoinitiators. In some embodiments the initiator is a photoinitiator selected from 2,2-Dimethoxy-1,2- diphenylethan-1-one (Irgacure 651, Ciba Specialty Chemicals) and bis(2,4,6-trimethylbenzoyl)-phenylphoshineoxide (Irgacure 819, Ciba Specialty Chemicals). In some embodiments, the initiator is a thermal initiators selected from peroxide and peroxide derivatives, In a particular embodiment, the initiator is bis(2,4,6-trimethylbenzoyl)-phenylphoshineoxide. In yet another particular embodiment, the lithium salt is LiTFSI, the polyether includes PEGDA and TMPTA, and the initiator is 2,2-Dimethoxy-1,2-diphenylethan-1-one. In yet another particular embodiment, the lithium salt is LiTFSI, the polyether is PEGDA, and the initiator is bis(2,4,6-trimethylbenzoyl)-phenylphoshineoxide.

Notably, the mixtures herein are devoid of solvents, and the process for fabricating the flexible, solid electrolyte films is devoid of solvents. Solvents are not needed to create the electrolyte films.

It is here noted that the plastic crystal phase of the SCN (e.g., SCN) is not a necessary criterion for achieving high conductivity in an electrolyte film. In advancement of the art, the present invention therefore provides electrolyte films made from completely amorphous mixtures of crosslinkable polyether (with or without crosslinking agent), SCN and lithium salt (e.g., PEGDA/SCN/LiTFSI), the amorphous mixtures being in the isotropic phase. As noted above, initiators and crosslinking agents may be present in the amorphous mixture as well. The amount of each component in the amorphous mixture is chosen such that the mixture is isotropic. The creation of suitable amorphous mixtures can be based upon ternary phase diagrams generated for a given choice of crosslinkable polyether, SCN and lithium salt. This is shown for particular embodiments in the Examples section herein, and, from that example, a skilled artisan can appreciate how to generate the same for other ternary systems.

To simplify this process, the initiator and the crosslinking agent need not be taken into account in the creation of the ternary phase diagram. This is not to say that they may have no effect on the creation of an amorphous mixture, but only that they are used in lesser amounts and their effect can be observed. More particularly, the ternary phase diagram can be generated by using the three main components—crosslinkable polyether, SCN and lithium salt—and an amorphous mixture of those components can be created by mixing the components in a ratio that resides in the isotropic region of the ternary phase diagram. Thereafter, any desired crosslinking agent can be added, and, if its inclusion negatively affects the amorphous, isotropic nature of the mixture, such can be observed. From there, an amount of crosslinking agent that does not compromise the isotropic property of the amorphous mixture can be experimentally determined. The process however is much facilitated by the generation of ternary phase diagrams. The same can be said for the initiator or any other addition. Ternary phase diagrams should be made in the temperature range at which the amorphous mixture is to be processed (i.e., crosslinked) to form the electrolyte film. For example, a photoinitiated crosslinking method can be carried out under ambient conditions, so a ternary phase diagram generated at 25 C would be helpful.

The crosslinkable polyether, SCN and lithium salt are thus mixed (together with any desired crosslinking agent) to form an amorphous mixture in the isotropic phase. The initiator may or may not be added at this stage. In particular embodiments, it is added later. In some embodiments, the mixing takes place in an inert atmosphere, with low humidity, to avoid compromising the lithium salt. In some embodiments, the temperature of the mixture may be increased to facilitate mixing the components and generate a homogeneous amorphous mixture in the isotropic phase. If generated by the addition of heat, the mixture should be observed as the temperature is reduced to ensure that the isotropic property remains. Often times it will.

Any suitable equipment can be used to generate the amorphous mixture.

The initiator can be added after the creation of the amorphous mixture and mixed to disperse to facilitate the subsequent crosslinking of the crosslinkable polyether.

The amorphous mixture with initiator is thereafter cast or shaped as desired for a given application such as in an electrochemical device. The amorphous mixture can be made into any desired shape by casting it onto an appropriately shaped substrate. Release layers may be employed when a free-standing electrolyte film is desired. The amorphous mixture may advantageously be cast directly onto an electrode, to remain adhered thereto.

Notably, the amorphous mixture is readily capable of being cast or roll coated onto any type of shape, thus making fabrication of more complex shapes a possibility.

The cast film can then be crosslinking by activating the initiator. This will crosslink the crosslinkable polyether (and any included crosslinking agent), and result in a finished electrolyte film. In accordance with this invention, the crosslinked film is to remain isotropic. In some embodiments, the crosslinking takes place in an inert environment.

The electrolyte films in accordance with the present invention are flexible, stretchable and transparent and exhibit good conductivities on the order of $10^{-3}$ S/cm, at room temperature. The films exhibit tensile strengths on the order of 0.4 MPa. The films exhibit elongation at break on the order of about 80% elongation.

Figure 14:
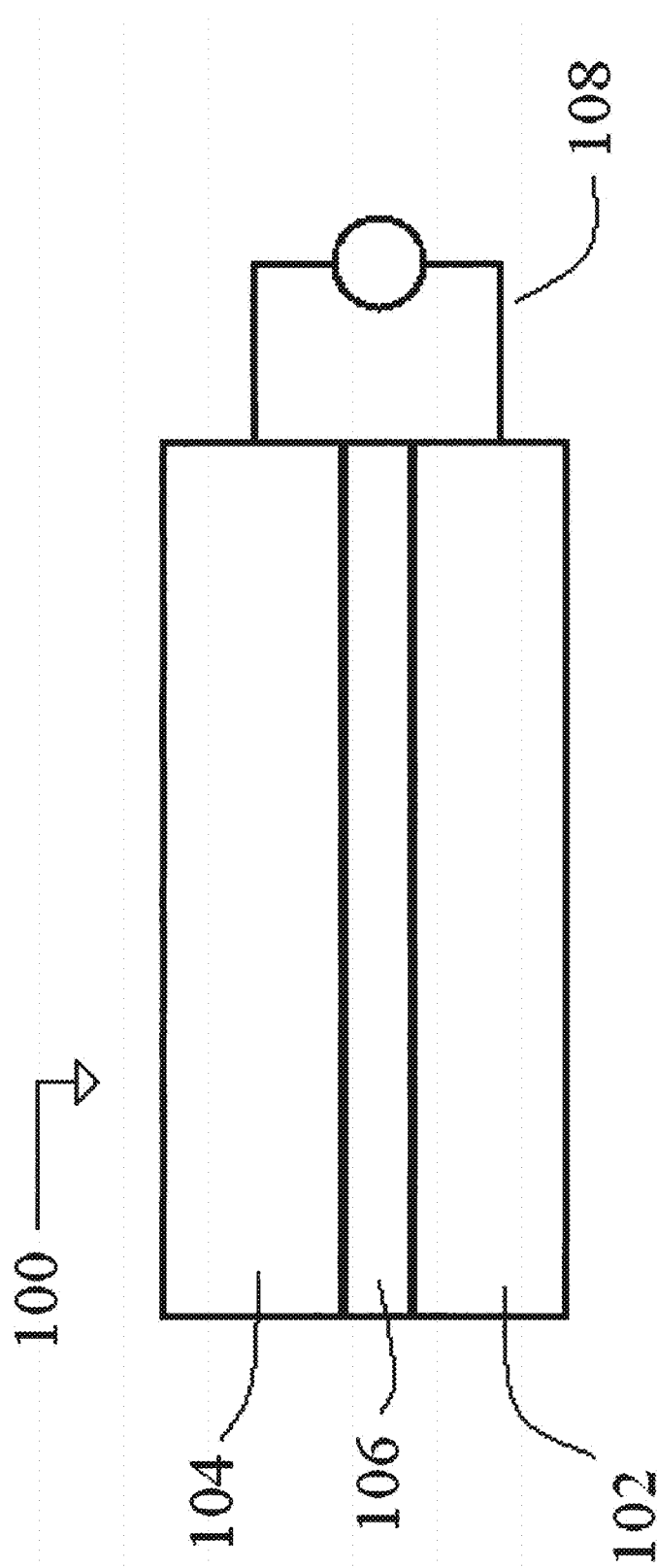
FIG. 14 is a schematic representation of a battery employing a solid electrolyte film of this invention.

The electrolyte films will find application in batteries and organic dye sensitized photovoltaic cells. In a particular embodiment, the electrolyte film is part of a battery 100 as seen in FIG. 14, the battery 100 having an anode 102 and a cathode 104 between which is sandwiched an electrolyte film 106 in accordance with this invention. An electrical load communicates with the anode and cathode through an appropriate contact, such as the wire 108.

In a particular embodiment, the lithium salt is LiTFSI and the polyether includes a PEGDA addition, which may or may not contain a crosslinking agent as described above. The amount of each component in the amorphous mixture is based on a total of 100 parts by weight, and, in particular embodiments the parts by weight for PEGDA/SCN/LiTFSI is from 40 to 50 parts a PEGDA addition, from 40 to 50 parts SCN and 30 parts LiTFSI. In the foregoing embodiment, the PEGDA addition may include form 0 to 30 wt % of a crosslinking agent.

In a particular embodiment the parts by weight of PEGDA/SCN/LiTFSI is 28/42/30, and no crosslinking agent is present. In this specific embodiment, the electrolyte had a conductivity of $2.88 \times 10^{-3}$ S/cm (room temperature), tensile strength of 0.18 MPa, and an elongation at break at 77%.

In yet another embodiment, the lithium salt is LiTFSI and the crosslinkable polyether includes PEGDA with crosslinking agent TMPTA. The amount of each component in the amorphous mixture is based on a total of 100 parts by weight, and, in particular embodiments the parts by weight for PEGDA(TMPTA 10 wt %)/SCN/LiTFSI is 28/42/30. In this specific embodiment, the electrolyte had a conductivity of $1.1 \times 10^{-3}$ S/cm (room temperature), tensile strength of 0.4 MPa, and an elongation at break at 74%.

In light of the foregoing, it should be appreciated that the present invention significantly advances the art by providing a stretchable, solvent free electrolyte film that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Example 1

This example describes the preparation of electrolyte films based on PEGDA/SCN/LiTFSI, and provides analysis of their relevant properties. A ternary phase diagram of PEGDA/SCN/LiTFSI was established in order to determine a processing window for fabricating all amorphous transparent polymer electrolyte films. Photopolymerization of PEGDA was carried out in the single phase region of the ternary mixtures. Although the starting ternary prepolymer mixtures may be in the single isotropic phase, there is always a possibility of either polymerization induced phase separation or phase transition taking place. It was found that the photo-cured polymer electrolyte remained in the single phase and formed a monolithic transparent film. Subsequently, AC impedance spectroscopy measurement was performed as a function of composition and temperature. The observed conductive behavior was analyzed in relation to of the ternary phase diagram of the starting prepolymer electrolyte mixture.

Materials:

Poly(ethylene glycol)diacrylate (PEGDA) with a number averaged molecular weight, Mn, of 700 g/mol was purchased from Sigma-Aldrich. Photo initiator, Irgacure® 651, was bought from CIBA. Lithium bis(trifluoromethane)sulfonimide (purity of 99.95%) and succinotrile (>99%) were also obtained from Aldrich. The solvents, methylene chloride (99.9%) and acetone (99.9%), were bought from Fisher Scientific and Mallinckrodt, respectively. Note that these solvents were used only in the preparation of the binary and ternary mixtures for the determination of the phase diagrams of the PEGDA/SCN/LiTFSI constituents.

Sample Preparation:

Various PEGDA/SCN binary mixtures were melt-blended in the isotropic region by mechanical stirring at 60° C. for 15 min to assure complete mixing. The samples were then kept in amber vials in a refrigerator at 4° C. LiTFSI was predried at 170° C. in a vacuum oven for 24 h. Various concentrations of binary PEGDA/LiTFSI mixtures were prepared in a glove box under dry nitrogen atmosphere by dissolving these materials in solution mixture of methylene chloride/acetone at 40:1 weight ratio. Solution casting was carried out under continuous nitrogen gas flow at 100° C. for 1 h. Finally, the blend samples were placed in a high vacuum chamber at room temperature for 24 h to further remove residual solvent or moisture, if any.

For the phase diagram determination, the ternary mixtures of PEGDA, SCN and LiTFSI were prepared in a glove box under nitrogen flow by co-dissolving in solution mixture of methylene chloride and acetone at 40:1 weight ratios. Evaporation of solvent was performed by casting a thin film of the solution in a hot stage at 80° C. under nitrogen flow. To avoid potential sublimation of SCN during prolong exposure to elevated temperatures, the upper temperature was limited to 80° C. for all blends containing SCN.

To fabricate self standing conductive membranes, appropriate compositions of PEGDA/SCN/LiTFSI corresponding the isotropic region of the ternary phase diagram were selected and then melt-mixed at room temperature. These mixtures were added with 2 wt % Irgacure 819® in reference to the PEGDA amount. The homogenous mixture thus obtained was placed on a Teflon® sheet with a Teflon frame spacer and then covered with a transparent PET film. Subsequently, UV polymerization was performed at 25° C. by illuminating with a UV Cure Lamp (Bondwand 350 nm) at an intensity of 5 mW cm$^{-2}$ for 15 min in a glove box under nitrogen atmosphere.

Sample Characterization:

Differential scanning calorimetry, DSC (TA Instruments, Model Q200) was employed to determine the melting points of various sets of the blends. Samples weighing 5~10 mg were hermitically sealed in aluminum pans covered with lids by crimping. An empty crimped pan with lid was used as a reference. In the case of PEGDA/SCN mixtures, the blend samples were rapidly cooled to −50° C., equilibrated at this temperature for 15 min, and then ramped up to 70° C. at a heating rate of 10° C. min-1. In the case of PEGDA/LiTFSI mixtures, the samples were hermitically sealed inside a glove box under nitrogen gas circulation. For this mixture, the DSC analysis was performed by cooling the samples to −50° C., keeping the samples at this temperature for 15 min, and then heating up to 250° C. at 10° C. cm$^{-1}$. Likewise, the ternary mixtures were sealed in aluminum cells in a glove box under nitrogen gas and the DSC scans were carried out between −50 and 80° C. at a 10° C. cm$^{-1}$. All DSC scans were ramped twice; the first cycle was performed to provide the same thermal history to all samples and only the data from the second run was used in the analysis. In order to corroborate the melting transitions and the morphology of the samples at different temperatures, microscopic characterization was performed using a polarized optical microscope (POM, Olympus BX60). Samples were placed between glass slides right after drying. A heating/cooling chamber, TMS93 Linkam, was used to control temperature under constant nitrogen gas flow to prevent moisture absorption during observation. POM pictures were taken using a 35 mm digital camera (EOS 300D, Canon).

Membrane Fabrication:

Guided by the ternary phase diagram, various PEGDA/SCN/LiTFSI compositions were thoroughly mixed in the isotropic region at ambient temperature without using any solvent. The homogeneous mixture was pour into a Teflon frame spacer having a rectangular or square shape with a dimension of 20×10 mm2 for tensile tests and 12×12 mm2 for the AC impedance measurements and then covered with a transparent PET (polyethylene terephthalate) film. The isotropic mixture was spread by using a roller. The PEGDA was photo-cured by illuminating with a UV light (5 mW cm-2) for 15 min at ambient temperature. The thickness of the photo-cured film was approximately 0.6 mm.

AC Impedance Spectroscopic Characterization

The UV cured PEGDA/SCN/LiTFSI network was homogeneous, transparent, and flexible. These flexible films were placed between polished stainless steel electrodes in a glove box under dry nitrogen gas. The assembly of the sample and electrodes was sealed to prevent moisture absorption during the AC impedance test. To avoid potential current leaking from the edges, the films were cut into a slightly larger dimension (12 mm×12 mm) relative to the dimension of the electrodes (10 mm×10 mm). The conductivity measurements were scanned from 13 MHz to 5 Hz with an applied voltage of 1 V at various temperatures using an AC impedance spectrometer (HP4192A, Hewlett-Packard) interfaced to a PC computer. Each measurement was performed at least three times to assure reproducibility.

Tensile Properties

A Dynamic Mechanical Analyzer (DMA) Q800 TA Instruments was used in constant displacement mode to perform tensile measurement using a set of film stretching clamps. The enclosed temperature controller allows continuous dry air flow preventing moisture absorption during the experiment. A constant displacement of 1 mm s$^{-1}$ was employed in all tests at 25° C.

Binary Phase Diagrams

Prior to determining the ternary phase diagram, it is important to understand the binary phase behavior of each pair of the ternary PEGDA/SCN/LiTFSI constituents. The binary phase diagram of SCN/LiTFSI mixture was already reported in previous work, and thus the present example is directed to the remaining pairs of PEGDA/SCN and PEGDA/LiTFSI. FIG. 1 shows a set of DSC thermograms of various PEGDA/SCN blend compositions shifted vertically at 10 wt % intervals. Compared to the melting temperature of PEO ($T_m$=60° C.), the $T_m$ of PEGDA is located at a significantly lower temperature of 10° C. and thus PEGDA is practically a liquid at ambient temperature.

The SCN exhibited dual phase transitions located at −40° C. and 58° C., which can be ascribed to crystal-to-plastic crystal (solid-solid) and plastic crystal-isotropic (solid-liquid) transitions, respectively. Note that a substance having both positional and orientational orderings is called solid crystal; without the orientational order it is called plastic crystal. Upon mixing with SCN, the melting point depression occurs in both constituent crystals as indicated by arrows. However, the crystal-to-plastic crystal transition of SCN at −40° C. remains virtually invariant with the addition of PEGDA.

The phase diagram thus obtained exhibits a eutectic point at −10° C. and approximately at 65 wt % of PEGDA concentration. The SCN solid-solid transition at −40° C. remains virtually constant with increasing PEGDA. Of particular importance is that our theoretical model truly captures the eutectic trend of the experimental phase diagram of the SCN/PEGDA blends.

Figure 2:
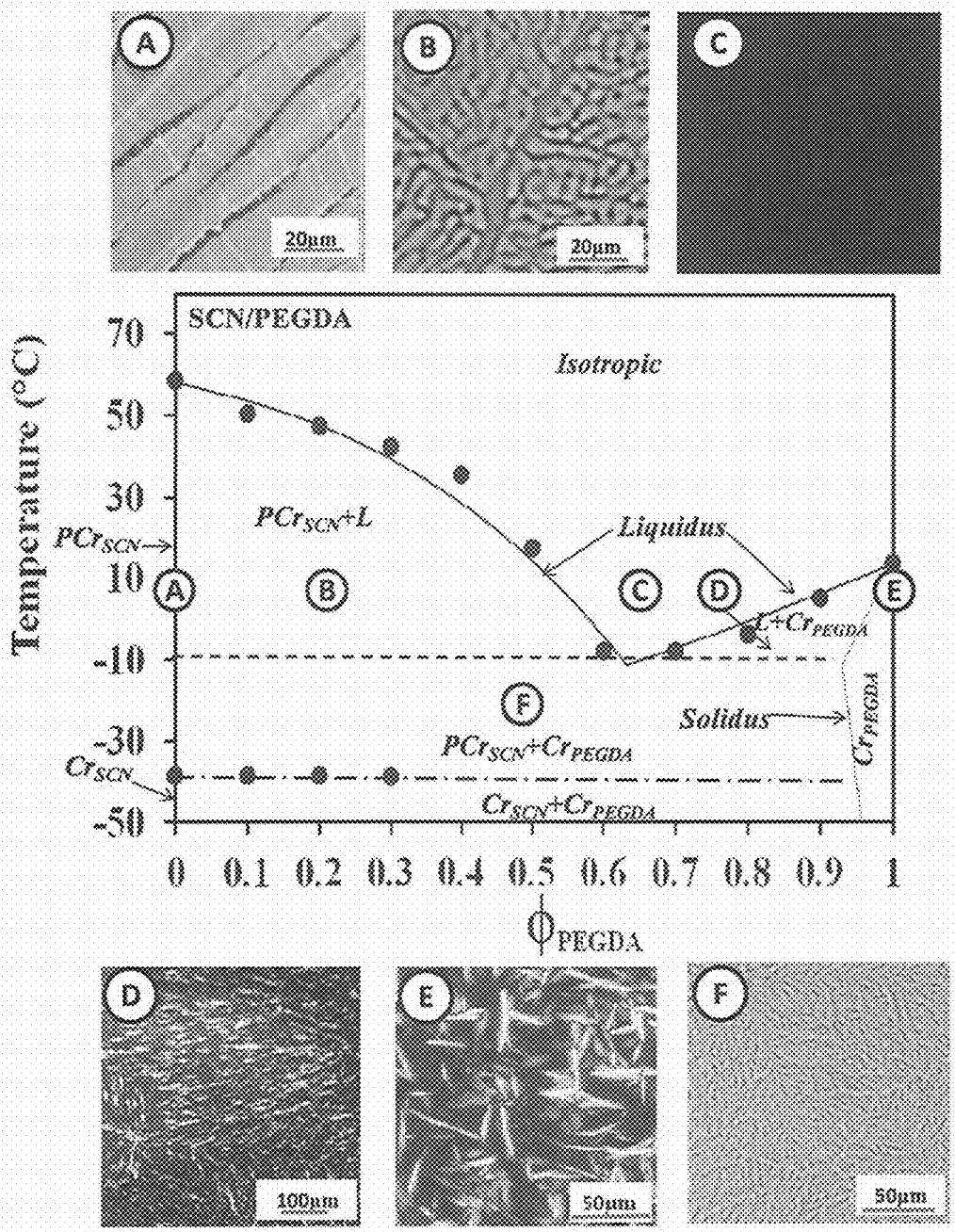
FIG. 2 is a binary phase diagram of a SCN/PEGDA mixture, wherein the pictures shown therein show the morphology of the blends corresponding to the locations A, B, C, D, E and F provided on the phase diagram.

Further, the coexistence phase regions can be verified in the corresponding pictures depicted in FIG. 2, labeled with capital letters. The pure SCN plastic crystal ($PCr_{SCN}$) shows plate-like crystals with numerous crazes (see picture A) suggestive of brittle nature of the SCN crystals. However, at a high SCN concentration, a 'degenerate' seaweed type lamellar growth occurs with tip splitting and side branching into the isotropic phase (see picture B in FIG. 2).

This POM observation is suggestive of the $PCr_{SCN}$+L coexistence region. At intermediate concentrations, completely dark appearance is seen under crossed polarizations and also textureless in the unpolarized condition, indicative of an isotropic region (see picture C). At a higher concentration of PEGDA corresponding to the L+$Cr_{PEGDA}$ region, bright birefringent entities can be seen in the polarized optical microscopic (picture D). The well developed needle type lamellar crystals of PEGDA are observable in picture E. Picture F was taken in the coexistence region of SCN plastic crystals+PEGDA crystals ($Cr_{PEGDA}$), in which the branching SCN dominates over the plastic crystals of PEGDA in the unpolarized view.

Figure 3:
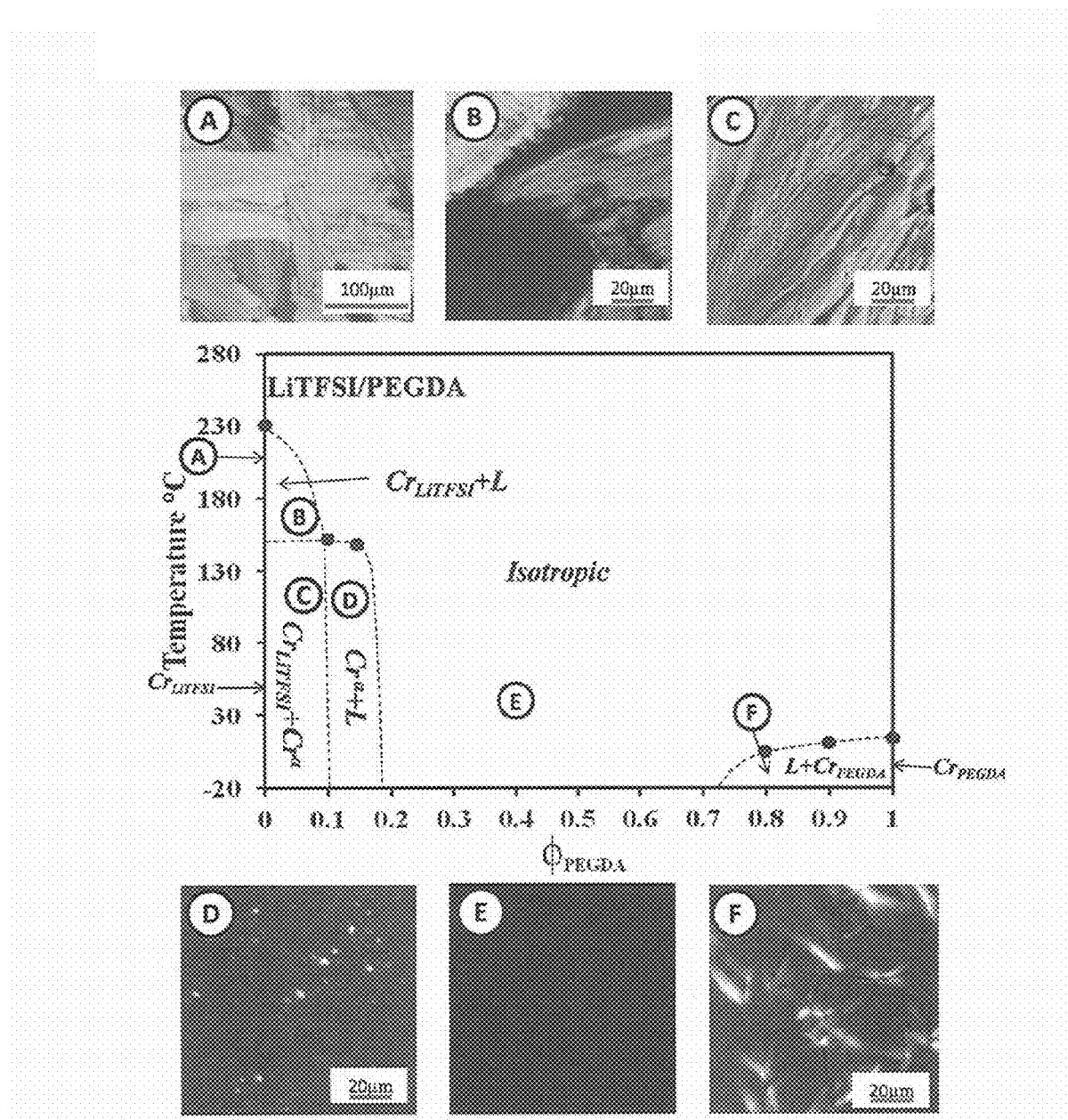
FIG. 3 is a binary phase diagram of a LiTFSI/PEGDA, wherein the pictures shown therein show the morphology of the blends corresponding to the locations A, B, C, D, E and F provided on the phase diagram.

Next, the PEGDA/LiTFSI phase diagram was constructed by means of DSC and optical microscopy. In FIG. 3 is shown the depressed melting transition points of PEGDA crystals in the LiTFSI-rich compositions and a wide isotropic region between 30 and 85 wt % LiTFSI. Picture A shows the morphological features of neat LiTFSI crystals forming typical overlapped needles packed by layers. The transition points at high lithium salt concentration resemble the incongruent melting trend found in the PEO/LiTFSI system of our previous work as well as by other authors, except that there are lesser numbers of incongruent crystals developed with a much wider isotropic region in the present system. Moreover, the change in crystalline appearance at concentration close to 90 wt % LiTFSI was further confirmed by polarized optical microscopy.

Observation under the cross-polarization below 150° C., the LiTFSI crystal ($Cr_{LiTFSI}$) was found to coexist with another crystalline form of LiTFSI ($Cr^a$), whereas a crystal+isotropic region ($Cr_{LiTFSI}$+L) identifiable above 150° C. (pictures (B) and (C) in FIG. 3). It may be inferred that the low molecular weight PEGDA makes the isotropic region wider in comparison with the phase diagram of PEO/LiTFSI.

Addition of PEGDA, bright entities were found to disperse within the isotropic matrix suggestive of the $Cr^a$+L in FIG. 3 (see picture D). Concentrations between 80 and 20 wt % LiTFSI do not show any evidence of ordered structures in the temperature range investigated. Pictures taken in this gap under cross-polarizations are dark as depicted in picture E. Above 80 wt % PEGDA, highly birefringent aggregates of PEGDA curved crystals were seen in the continuum of isotropic liquid, suggestive of L+$Cr_{PEGDA}$ region as illustrated by picture F.

Ternary Phase Diagram

Figure 4:
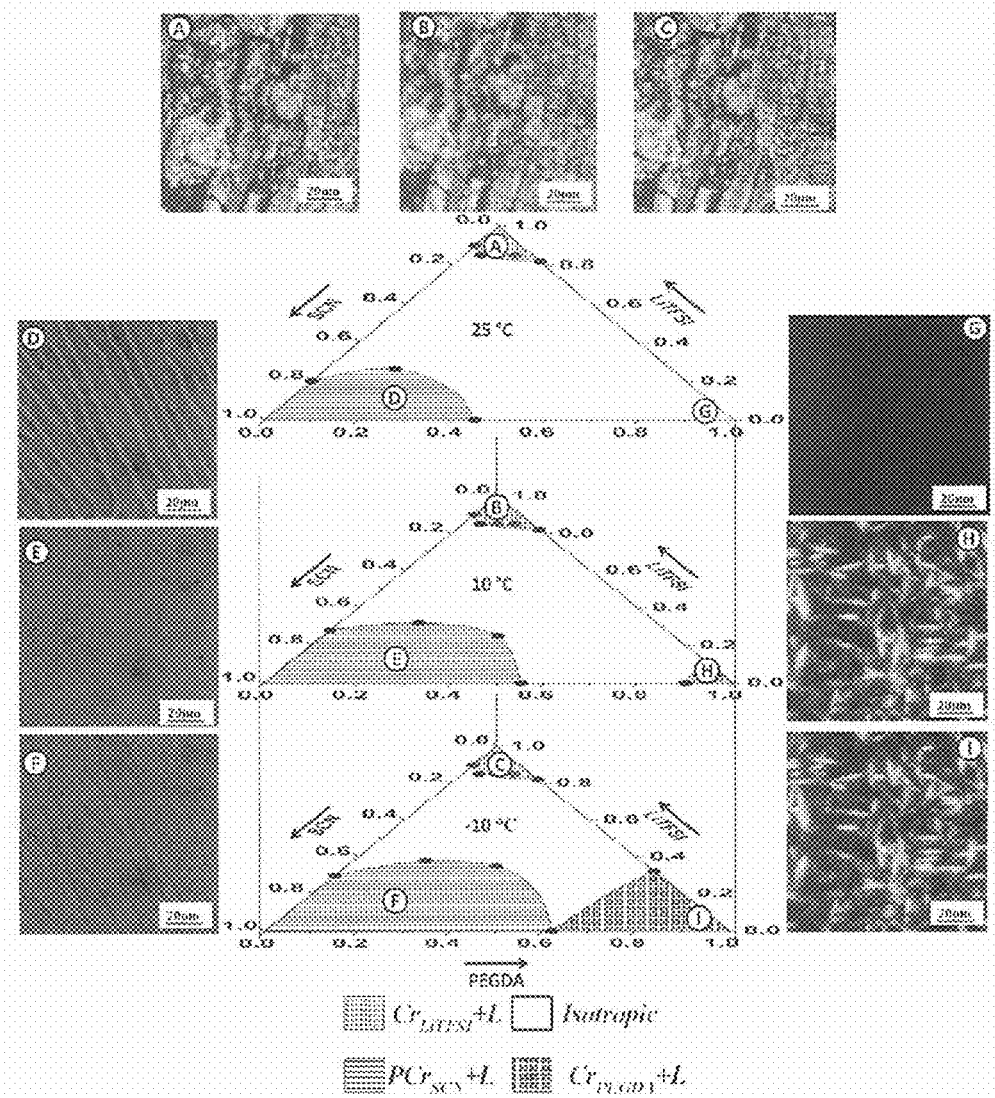
FIG. 4 is a prism type phase diagram of ternary blends of PEGDA/SCN/LiTFSI as a function of temperature (from −10–25° C.), wherein the pictures shown therein show the morphology of the blends corresponding to the locations A, B, C, D, E, F, G, H and I provided on the phase diagram.

FIG. 4 exhibits a prism type ternary phase diagram of PEGDA/SCN/LiTFSI mixtures stacked vertically as a function of descending temperature (i.e., 25, 10, and −10° C.). At 25° C., the wide isotropic region covers a major part of the triangular concentration plane. At very high concentrations of LiTFSI, highly birefringent crystalline textures were observable (see picture A). This LiTFSI crystal structure remains unchanged upon cooling to 10° C. (picture B) and further to −10° C. (picture C). The dark regions between these birefringent entities may be the entrapped isotropic phase, implying the $Cr_{LiTFSI}$+L coexistence region. The envelope of this small coexistence region remains unchanged upon lowering the temperature.

At high SCN concentrations, seaweed type branching morphology is discernible only in the unpolarized POM configuration (see pictures (D-F)). The lack of any identifiable texture under the cross-polarized POM observation implies the nature of plastic crystals having no orientational order. These SCN plastic crystals coexist with the isotropic phase showing the liquid phase in the interstitial areas between the branching lamellae of SCN plastic crystals (see pictures D-F), implying the $PCr_{SCN}$+L coexistence region. Upon lowering temperature to 10 and −10° C., the $PCr_{SCN}$+L coexistence region widens incrementally. As expected, no PEGDA crystal can be discerned at 25° C. (Picture G), since it is above the melting temperature of the pure PEGDA. However, birefringent aggregates of curved crystals developed upon lowering to 10° C. (see Picture H). When the temperature was further cooled to −10° C., the $Cr_{PEGDA}$+L envelope widens, but the same PEGDA crystal persists (Picture I).

Impedence Spectroscopy Characterization of Flexible Membranes

Figure 5:
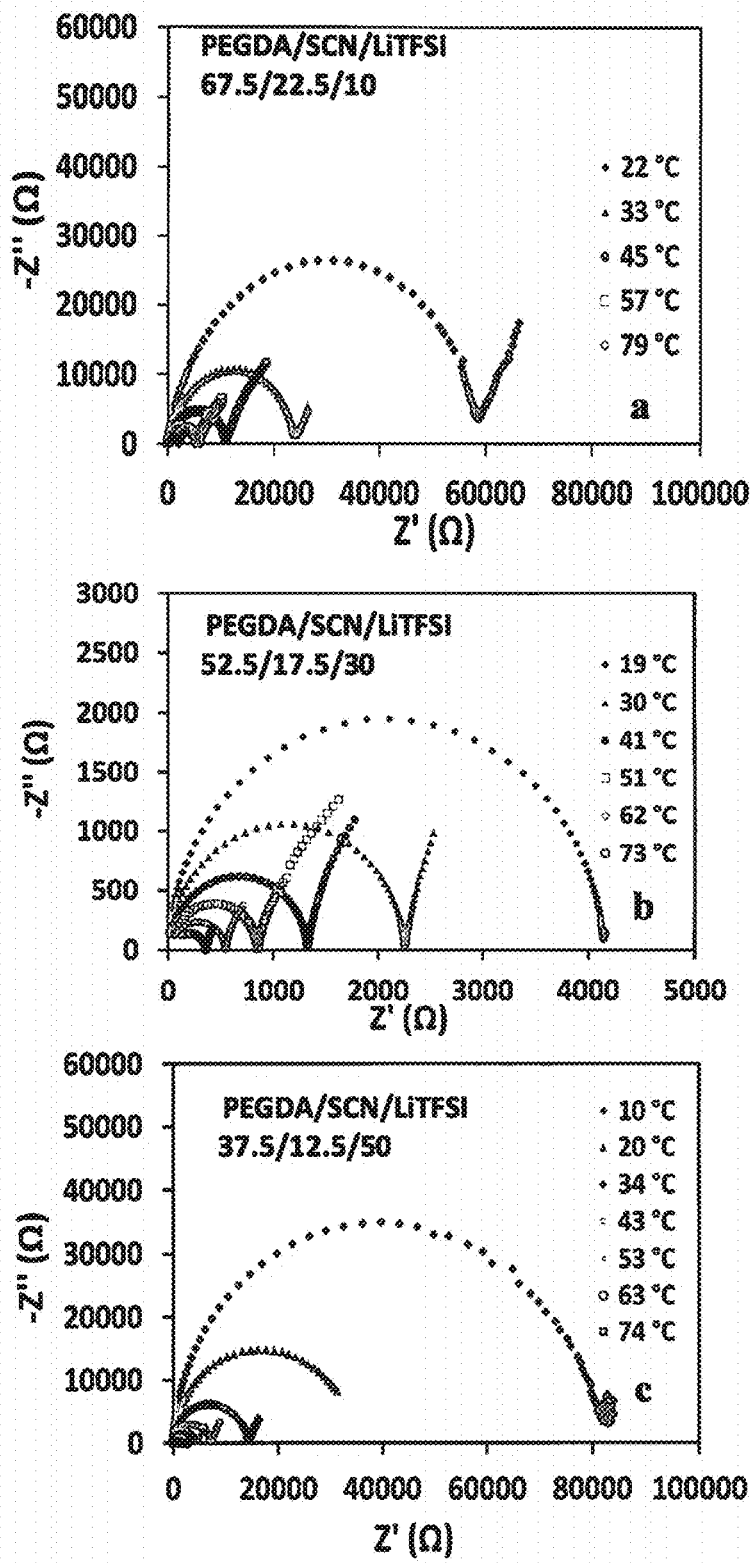
FIG. 5 shows the temperature dependence of the Cole-Cole plots for various concentrations of PEGDA/SCN/LiTFSI, the PEGDA/SCN weight ratio fixed at 3/1, wherein the uppermost graph is for PEGDA/SCN/LiTFSI with weight ratio of 67.5/22.5/10, the middle graph is for PEGDA/SCN/LiTFSI with weight ratio of 52.5/17.5/30, and the lowest graph for PEGDA/SCN/LiTFSI with weight ratio of 37.5/12.5/50.

Guided by the ternary phase diagram, several membranes were prepared for various compositions at 25° C. within the isotropic region in accordance with the methodology described in the sample preparation and characterization section. In FIG. 5 are shown the Cole-Cole plots, i.e., imaginary impedance Z" versus real component Z' plots for various flexible photo-cured materials with different LiTFSI concentrations, but fixed PEGDA/SCN ratio at 3/1 by weight. As manifested by shrinking diameters of the semi-circles, the material resistivity to ion transport declines with increasing temperatures. Ionic conductivity σ was calculated in accordance with the relationship: $\sigma=L/(ZA)$, where L is the sample thickness, Z is the distance between the intersections in the real component axis of the semicircle in the Cole-Cole plot and A is the area of the electrodes.

When the temperature is reduced to 10° C., a small coexistence region of ($Cr_{PEGDA}$+L) develops at very high concentrations of PEGDA, manifesting the curved and/or needle-like crystals of PEGDA. The region, $PCr_{SCN}$+L expands while maintaining the stratified lamellar morphology. However, the $Cr_{LiTFSI}$+L region remains practically unchanged even when temperature is lowered to $-10°$ C. At this temperature the eutectic point of the PEGDA/SCN mixture can be discerned, representing the triple point of the plastic crystal+liquid+crystal phases. This large isotropic region at low temperatures is expected to serve as a preferred condition for fabricating conductive membranes with isotropic phases at low subambient temperatures.

Figure 6:
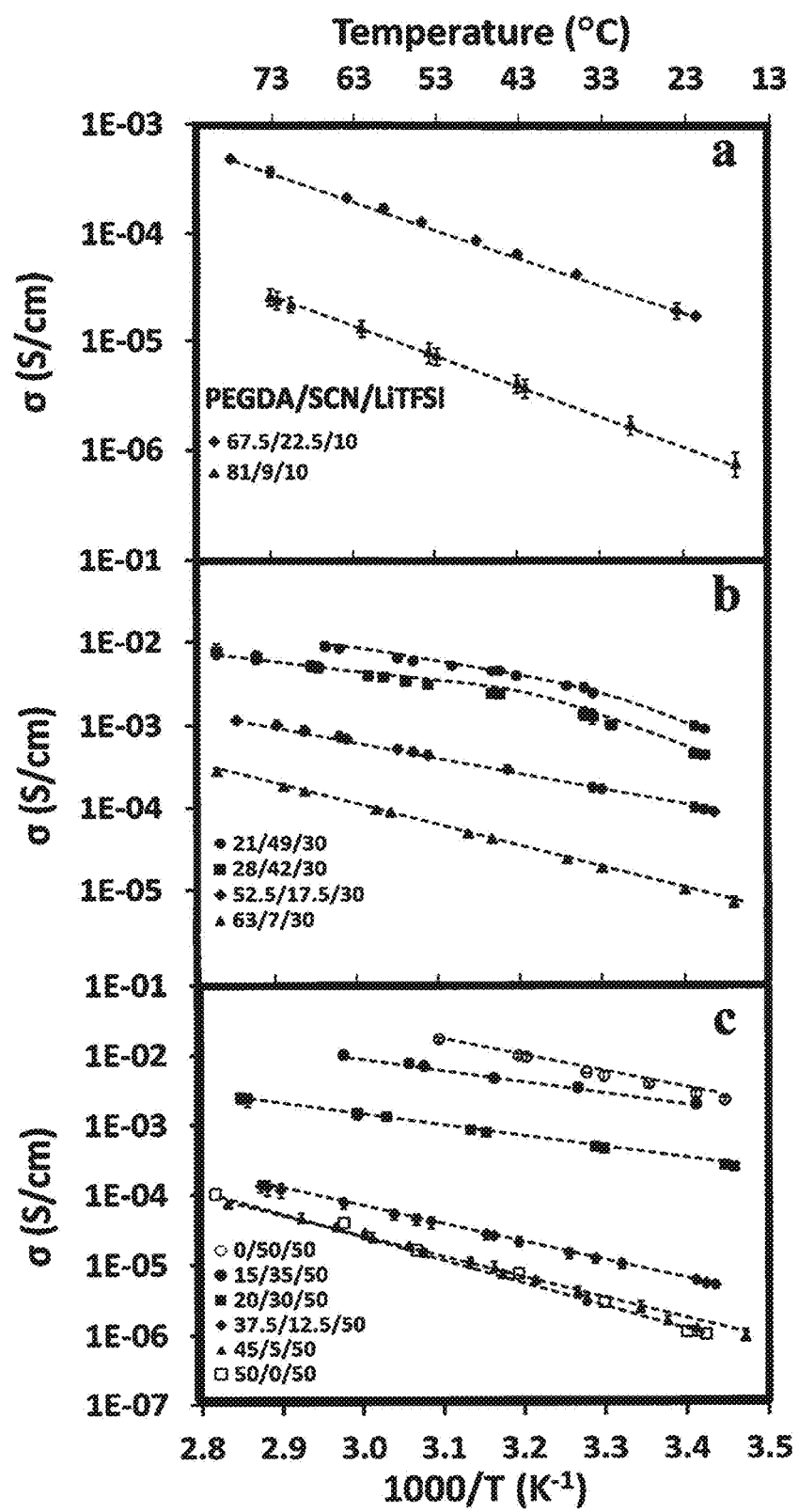
FIG. 6 is Arrhenius plots of conductivity versus reciprocal temperature as a function of compositions of PEGDA/SCN/LiTFSI films at fixed LiTFSI concentrations of: a) 10 wt %, b) 30 wt % and c) 50 wt %.

In FIG. 6 are shown the Arrhenius plots of the observed conductivity for three different LiTFSI concentrations of (a) 10, (b) 30 and (c) 50 wt % at the fixed 3/1 PEGDA/SCN ratio. Note that each weight ratio of PEGDA/SCN was maintained at: ● 3/7, ■ 2/3, ♦ 3/1, ▲ 9/1 in each figure (a, b, and c). Every data point was the average of at least 3 measurements with the error bars representing the standard deviations. FIG. 6a exhibits two different PEGDA/SCN/LiTFSI weight ratios: 67.5/22.5/10 and 81/9/10 corresponding to 3/1 and 9/1 weight ratios of PEGDA/SCN, respectively. The conductivity of both systems exhibit linear slopes in the conductivity versus reciprocal temperature plots. Increasing SCN concentration from 9 to 22.5 wt % enhances ionic conductivity by over an order of magnitude.

When LiTFSI concentration is increased to 30 wt %, the ion transport is improved for all compositions, raising conductivity several orders of magnitude with increasing SCN loading. At relatively high SCN contents of 42 and 49 wt %, the ionic conductivity exceeds the value of $10^{-3}$ S cm$^{-1}$ at ambient temperature and approaches the order of $10^{-2}$ S cm$^{-1}$ upon increasing to the operating temperature of 60-70° C. (FIG. 6b).

FIG. 6c shows the Arrhenius plot of ionic conductivity versus reciprocal temperature as a function of PEGDA/SCN weight ratio for a fixed LiTFSI concentration of 50 wt % in comparison with two binary blends of 50/50 PEGDA/LiTFSI and 50/50 SCN/LiTFSI. In the former without the SCN plasticizer, the conductivity drops to its lowest conductivity of the order of $10^{-7}$ S cm$^{-1}$. However, 50/50 SCN/LiTFSI shows the highest conductivity in the range of $10^{-3}$ to $10^{-2}$ S cm$^{-1}$, but in the absence of the PEGDA network such mixture is paste-like without sustainable mechanical strength.

Figures 7, 8:
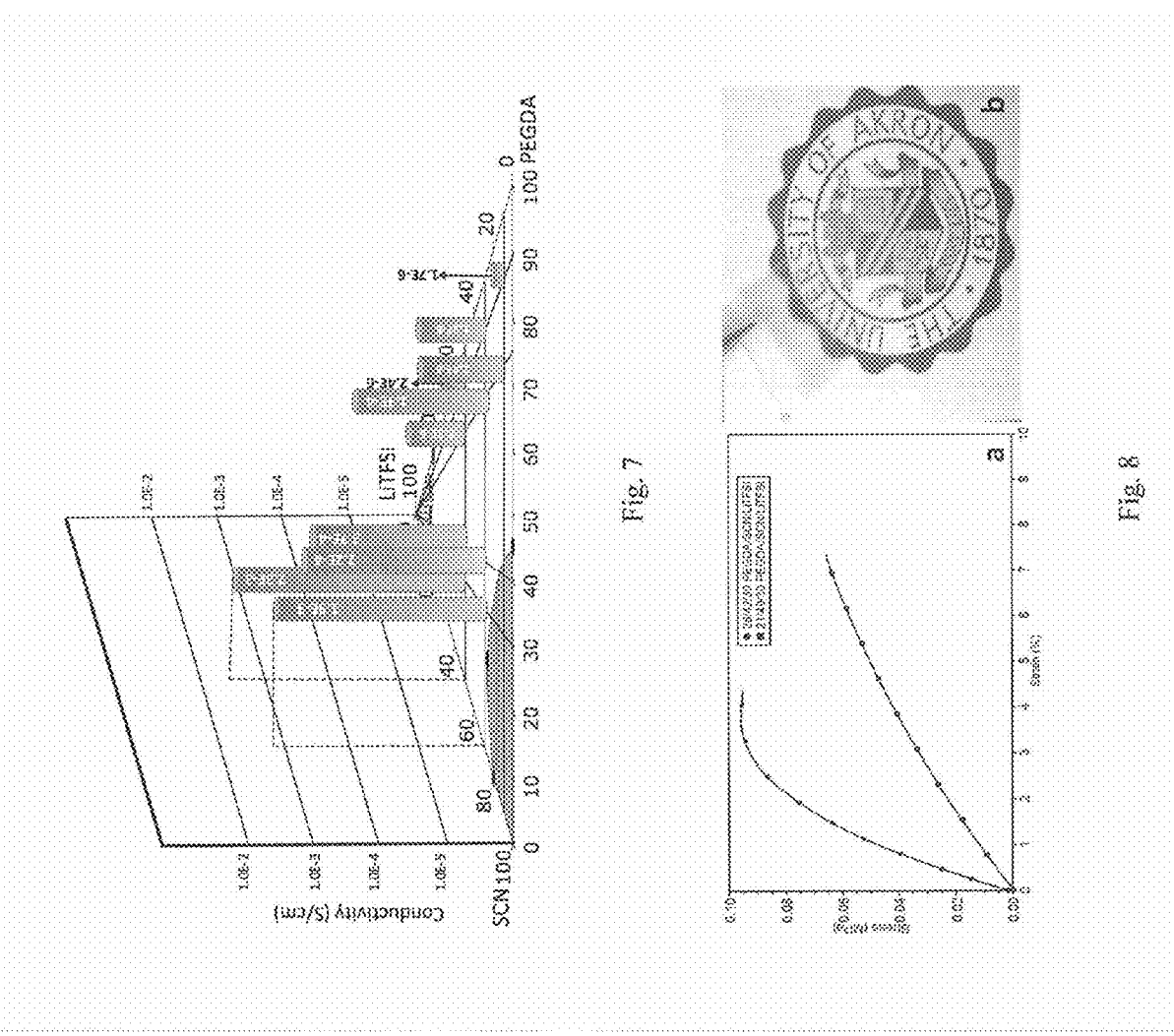
FIG. 7 is a graph of the variation of ionic conductivity of the crosslinked polymer electrolyte membranes in relation to the ternary phase diagram of uncured PEGDA/SCN/LiTFSI mixtures within the isotropic amorphous region.

To further illustrate the optimum conductivity as a function of compositions of membrane precursors, the room temperature ionic conductivity was plotted in the vertical axis perpendicular to the triangular plane of the PEGDA/SCN/LiTFSI ternary phase diagram in logarithmic scale (FIG. 7). Note that the cured films remained completely amorphous without undergoing polymerization-induced phase separation or crystallization. At 90 and 80 wt % PEGDA, one notes the appearance of the highest conductivity values at the 30 wt % of LiTFSI among the three LiTFSI concentrations of 10, 30, and 50 wt % tested. This trend continues to hold with increasing SCN concentrations to 40 and 30 wt % of PEGDA, except that the room temperature ionic conductivities increase significantly from $10^{-6}$~$10^{-5}$ S cm$^{-1}$ to the levels of $10^{-4}$~$10^{-3}$ S cm$^{-1}$. More importantly, when one compares the mixtures with varying lithium salt concentrations while maintaining the PEGDA/SCN ratios fixed, the optimum ionic conductivity lies in between 40-50 wt % of SCN at 30 wt % of LITFSI.

As pointed earlier, the SCN is an excellent ionizer to the lithium salt as well as an effective conductivity enhancer, but the PEGDA network is needed for the mechanical support of the flexible electrolyte film. Tensile measurement was performed on the PEGDA/SCN/LiTFSI films having 30% Li salt that exhibited the highest room temperature ionic conductivity. In FIG. 8a are shown the stress-strain curves of two polymer electrolyte membranes of 28/42/30 and 21/49/30 PEGDA/SCN/LiTFSI compositions, showing small but reputable levels of ductility for the highly plasticized electrolyte membranes. As might be expected the tensile strength (~0.095 MPa) of the PEM membrane having a higher PEGDA concentration (i.e., 28/42/30 PEGDA/SCN/LiTFSI) is better than that afforded by the lower PEGDA content membrane of 21/49/30 PEGDA/SCN/LiTFSI (i.e., ~0.062 MPa). However, the PEM membrane with a higher SCN concentration exhibits a higher elongation at break due to the plasticization effect of SCN on the PEGDA cross-linked network. It should be emphasized that all PEM network films, prepared in the isotropic region of the ternary phase diagram, remained transparent after photo-curing.

FIG. 8b shows optical clarity exhibited by the 21/49/30 PEGDA/SCN/LiTFSI film having a thickness of 0.6 mm. According to our wide-angle X-ray diffraction study, this membrane exhibits a very broad amorphous peak, suggestive of completely amorphous character (data not shown). To further improve the extensibility of the PEM film, the experiment is now underway using a higher molecular weight PEGDA, e.g., 6,000 g/mol, which will be the subject of a future publication.

The present disclosure serves to demonstrate how the constructed phase diagram provides guidance to optimizing tensile properties and ionic conductivity of the electrolyte membrane. Within the isotropic working window of the ternary phase diagrams of PEGDA/SCN/LiTFSI precursor mixture, completely amorphous, self-standing flexible films were fabricated successfully. It is striking to find that the selected compositions of PEM films remained completely amorphous after photo-curing without undergoing polymerization-induced phase separation or polymerization-induced crystallization. The amorphous networks membranes exhibited remarkable room temperature ionic conductivities on the order of $10^{-3}$ S cm$^{-1}$. More importantly, the present solid-state polymer electrolyte membrane does not require any solvent during fabrication as well as in the battery application. It can be concluded that the PEGDA network provided mechanical support, whereas SCN served as an effective ionizer to the LiTFSI salt and also acted as excellent conductivity enhancer. The completely amorphous PEM film thus produced has many attractive features including light weight, solvent-free, self-standing, transparent, and safety. It is also melt-moldable into various shapes or geometries with outstanding conductivity comparable to or better than those of conventional lithium batteries that required organic solvents.

Example 2

This example describes the preparation of flexible, stretchable polymeric lithium electrolyte membranes with improved ionic conductivity and mechanical properties, and explores the use of crosslinking agent (TMPTA) as part of the crosslinkable polyether.

Materials

PEGDA with molecular weight Mn 700 g/mol and 6000 g/mol, LiTFSI and SCN were purchased from Sigma-Aldrich. Photo-initiator Irgacure 819 was obtained from Ciba and TMPTA was bought from Sartomer.

Sample Preparation

Samples containing 35/35/30 and 28/42/30 ratios of PEGDA6000/SCN/LiTFSI were prepared in a glove box under nitrogen gas atmosphere. Note that LiTFSI was dried at 175° C. in vacuum for 24 h to evaporate absorbed water if any. Three mixtures of PEGDA6000/SCN/LiTFSI with concentration of 28/42/30 were modified by incorporating 10, 20 and 30 wt % of TMPTA with respect to PEGDA6000. These samples will be labeled hereafter as:

28/42/30 PEGDA6000[10% TMPTA]/SCN/LiTFSI,
28/42/30 PEGDA6000[20% TMPTA]/SCN/LiTFSI and
28/42/30 PEGDA6000[30% TMPTA]/SCN/LiTFSI,
respectively.

All samples were added with Irgacure 819® as photo-initiator at a concentration of 2 wt % with respect to the acrylate loading, i.e., PEGDA and TMPTA. It should be mentioned that all samples were prepared in a glove box under nitrogen atmosphere to prevent water absorption. These samples were heated to 60° C. for 10 min and vigorously stirred to assure complete mixing. After cooling to room temperature, the mixtures exhibit fluidity, transparency and homogenous, and then stored in dark vials in a dry-box at room temperature.

Liquid mixtures were poured onto a PET film using Teflon® rectangular frames having a dimension of 15 mm in length, 5 mm in width and an average thickness of 0.6 mm. Another PET transparent film was placed on top of the filled frames and then rolled using a rubber roller to prepare sample with uniform thickness. Samples were then exposed to continuous UV illumination at the intensity of 5 mW/cm$^2$ and a wavelength of 350 nm for a period of 15 min. Then these cured samples were carefully peeled off from the substrate and vacuum sealed before characterization. This process was carried out in a glove box filled with dry gas nitrogen.

Sample Characterization

Thermal transitions of samples prepared with PEGDA6000 were determined by means of DSC TA Instruments model Q200. A sample weighing 10~15 mg of liquid mixtures containing PEGDA6000 was placed in aluminum pan and crimped with an aluminum lid. Sealed mixture was then placed in the DSC cell using an empty aluminum pan as reference. DSC scans were performed by first heating the sample to 80° C. at 10° C./min and then cool it down to −75° C. by liquid nitrogen. Sample was heated again at a 10° C./min to 80° C. In order to determine the effect of crosslinking on thermal transitions, samples were placed in aluminum pans and exposed to UV light for 15 min at 5 mW/cm$^2$. Later on, cured samples were placed in the DSC and then covered with an aluminum lid and crimped. The same temperature ramping program was employed on both materials before and after crosslinking. It is worth to mention that sample preparation for DSC analysis was also performed in the glove box under gas nitrogen circulation.

It can be anticipated that the differences in molecular weight of PEGDA and the addition of TMPTA would have a considerable effect on the conversion and curing time of the crosslinking reaction. PhotoDSC is a useful technique that couples a regular DSC with a UV lamp to record the heat flow at constant temperature of the sample undergoing photo-polymerization. The enthalpy due to the photoreaction as detected by the DSC is recorded as a function of time until the reaction reaches the equilibrium. Liquid sample was placed in aluminum pan and carefully weighed. Subsequently, filled open pan was placed in the DSC cell together with an empty aluminum pan as reference. Temperature was kept at 25° C. while a constant flow of nitrogen serves as inert atmosphere. UV-lamp shutter was synchronized with DSC controller, so that time started counting simultaneously when UV irradiation began. Sample and reference materials were exposed to a UV-light beam with a wavelength of 350 nm and an intensity of 5 mW/cm$^2$ for 15 min. Each sample was repeated several (at least 3) times in order to assure statistical significance.

Crosslinked membranes having an average thickness of 1.5 mm were sandwiched in between two polished stainless steel plates of 10×10 mm$^2$. These electrodes were coupled to a Hewlett Packard 4192A LF Impedance Spectroscopy Analyzer (IS) to measure complex impedance as a function of frequency at different temperatures. A home-made heating chamber was fabricated allowing a constant flow of nitrogen to keep the sample in an inert environment during the IS test. A voltage of 1.0 V was employed as signal amplitude between 13 MHz and 5 Hz. Different samples of the same composition were tested at least three times and presented as an average with standard deviation.

A Dynamic Mechanical Analyzer (DMA) TA Instruments model Q800 was employed in constant strain rate mode to perform tensile test of the cured films at 1 mm/min. Samples with dimensions of 15.0×5.0×0.5 mm$^3$ were stretched until break while recording stress as a function of strain. The temperature was set at 25° C. with a continuous flow of dry air to minimize moisture intake. Every experiment was repeated at least four times in order to assure reproducibility.

Differential Scanning Calorimetry

Figure 9:
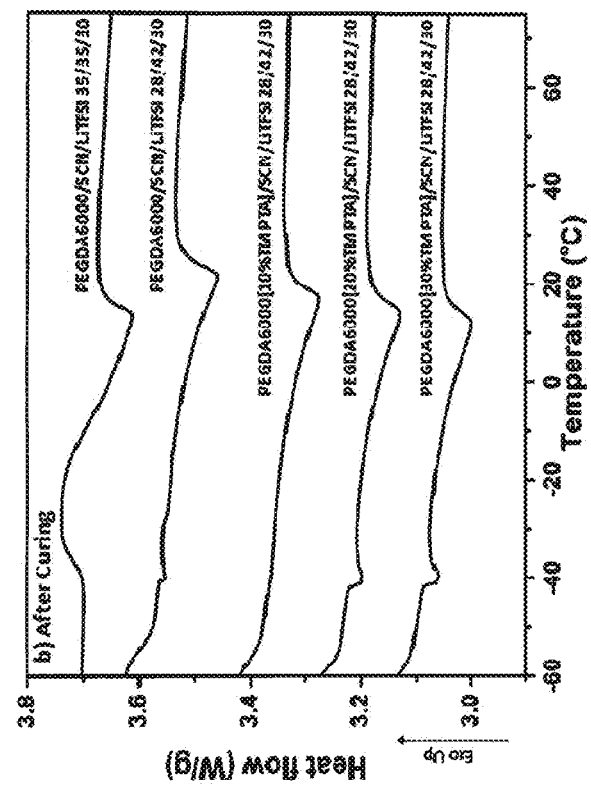
FIG. 9 is Differential Scanning calorimetry curves of various mixtures using PEGDA6000 showing transition features, part (a) showing liquid samples before curing and (b) showing solid samples after curing.
Figure 9:
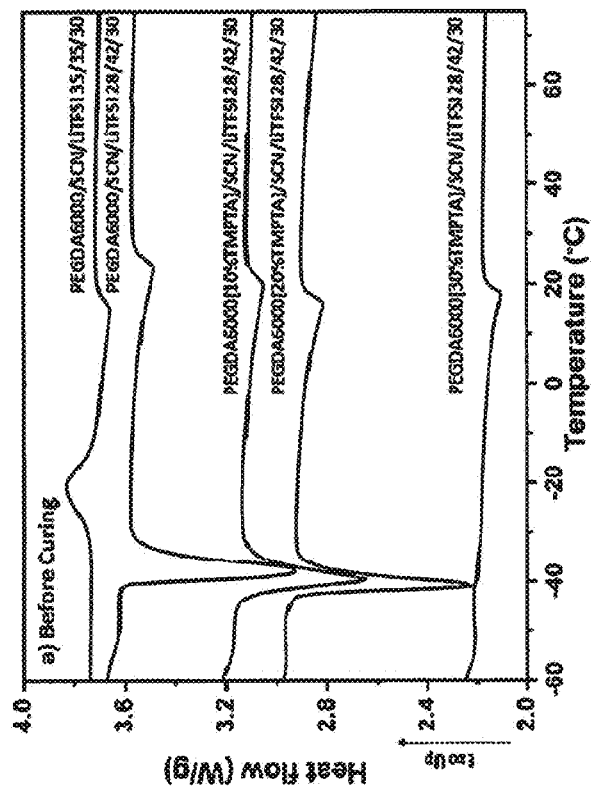

In previous work, it was established that the crystal-to-crystal-to-isotropic of SCN was −40° C. and 58° C., whereas the melting points of PEGDA6000 and LiTFSI were located at 59 and 230° C., respectively. In FIG. 9 are shown the DSC thermograms before and after curing of various PEGDA6000/SCN/LiTFSI mixtures. These ternary mixtures contain 2 wt % of photo-initiator Irgacure 819 with respect to the amount of acrylates (PEGDA and/or TMPTA). FIG. 9a exhibits the DSC scans of various blends before crosslinking. The 35/35/30 PEGDA6000/SCN/LiTFSI composition shows an exothermic peak at −20° C. and an endothermic melting peak at 15° C. The low temperature peak may be attributed to cold crystallization of PEGDA6000, whereas the higher endothermic peak corresponds to the melting point of the PEGDA6000 crystals. The DSC thermogram corresponding to the sample 28/42/30 PEGDA6000/SCN/LiTFSI exhibits a transition at −38° C. associated with the transformation from the solid crystal to plastic crystal of SCN. This sample also undergoes melting transition at 23° C. which is higher than the melting point of the sample 35/35/30 PEGDA6000/SCN/LiTFSI. It was determined from a ternary phase diagram of PEGDA/SCN/LiTFSI that the plastic crystal structure of SCN becomes more pronounced when SCN concentration is increased. This explains the increased melting temperature when SCN weight percentage is raised from 35 to 42 wt %. With the addition of 10 wt % of TMPTA relative to PEGDA6000, the 28/42/30 PEGDA6000 (10% TMPTA)/SCN/LiTFSI mixture shows the melting point transition decreasing from 23 to 20° C. When TMPTA is raised to 20 wt %, the melting peak declines further to 16° C. Note that the crystal to plastic crystal transition of SCN also decreases slightly from −38° C. for 28/42/30 PEGDA6000/SCN/LiTFSI without any TMPTA to −39 and −41° C. for samples containing 10 and 20 wt % of TMPTA, respectively. It appears that TMPTA is capable of plasticizing the ternary mixture by lowering the melting points of the constituents including SCN. However, increased addition of TMPTA to 30 wt % a different thermal behavior is noticed. In this mixture, the crystal to plastic crystal transition is suppressed while the melting point is increased to from 15 to 18° C. The present cooling protocol of the sample in the DSC might be inadequate to achieve the complete crystallization of SCN, thereby affecting the thermal response of the sample.

FIG. 9b displays the DSC scans of crosslinked samples of the same compositions of FIG. 9a. The melting transition of 35/35/30 PEGDA6000/SCN/LiTFSI composition occurs at 13° C. The exothermic transition at −20° C. corresponds to the cold crystallization of PEGDA observed previously. It seems that the present photopolymerization reaction is incomplete and residual PEGDA6000 might undergo cold crystallization. The 28/42/30 PEGDA6000/SCN/LiTFSI mixture exhibits a melting peak at 21° C. and a small endothermic transition at −40° C. associated with SCN crystals that transform to plastic crystals. The addition of TMPTA systematically reduces the melting transition from 21° C. for the sample with no TMPTA to 12° C. for a crosslinked material having 30 wt % of TMPTA relative to PEGDA6000. The crystal to plastic crystal transition in the photo-polymerized samples containing TMPTA exhibits a small peak around −40° C. An important observation is that the melting points of cured materials are lower than those with the same compositions before polymerization. To explain this, it is necessary to recall the phase behavior of SCN/LiTFSI system. SCN has a greater affinity to lithium salt in comparison with the binary phase behavior of PEO and/or PEGDA with LiTFSI. Therefore, the crosslinking process is facilitating the interactions of SCN with LiTFSI by sequestering reactive PEGDA into a polymeric network.

Photopolymerization Kinetics

Figure 10:
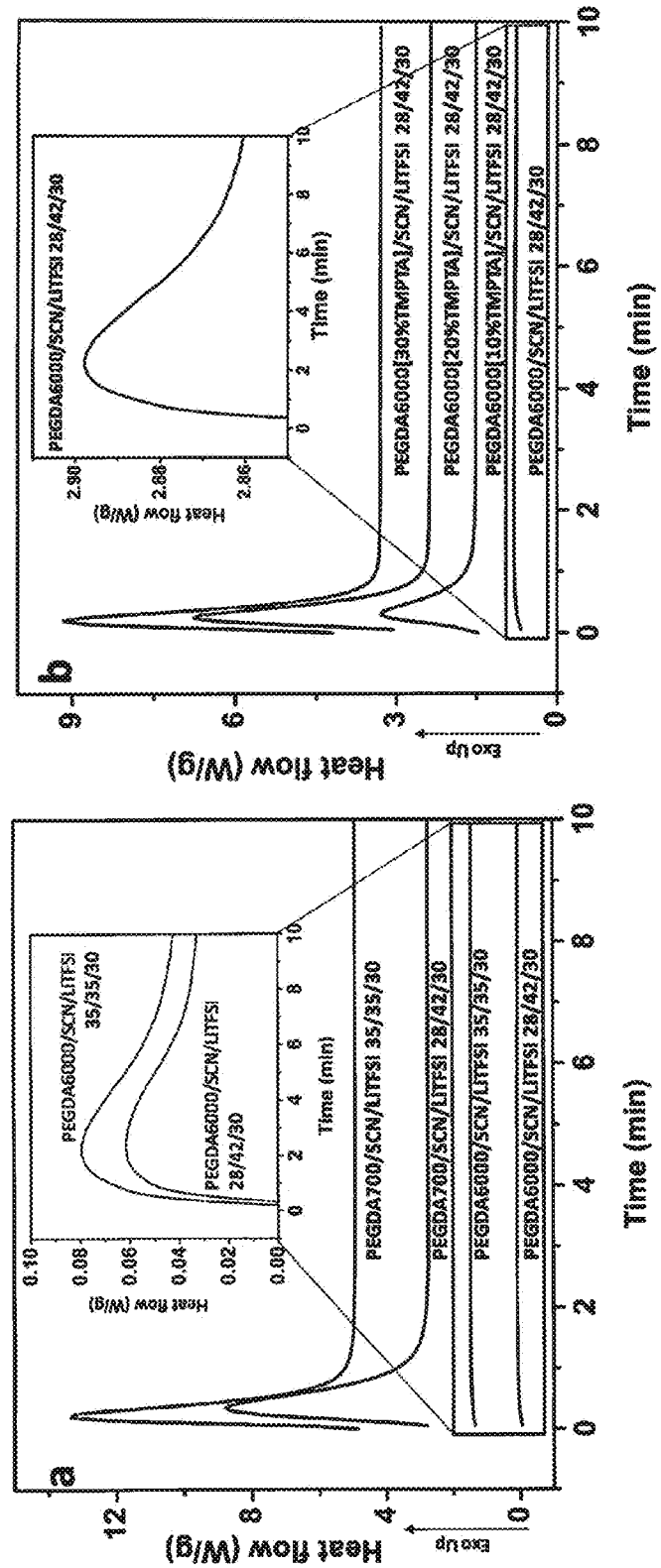
FIG. 10 is PhotoDSC isothermal curves showing the exothermic signal of PEGDA 700 and 6000 during UV curing at 25° C., part (a) showing the effect of PEGDA molecular weight and (b) showing the effect of TMPTA addition.

In polymeric electrolytes, photopolymerization has been extensively examined to elucidate the effect of additives, composition and chemical nature of materials on electrochemical properties. However, very few reports are available in open literature describing the effect of crosslinking conversion or kinetic features on the final characteristics of the polymeric electrolytes. displays the isothermal photoDSC thermograms of various ternary mixtures at 25° C. FIG. 10a compares the effect of two different PEGDA molecular weights on the PEGDA/SCN/LiTFSI mixtures. The exothermic transition corresponding to the ternary mixtures containing PEGDA700 are significantly higher than those with PEGDA6000 (FIG. 10a inset). Higher molecular weight also means lower amount of acrylate groups available per weight unit, which leads to a lower amount of energy released by the reaction of PEGDA6000. Molecular collision is less in materials with increasing molecular weight, which in turn reduces the reaction rate (thus requiring longer time) of PEGDA6000 (~7 min) in comparison with PEGDA700 (<1 min) Note that the reaction time is taken as the onset point of the decaying portion of photoDSC curves. FIG. 10b shows the photoDSC curves of PEGDA6000/SCN/LiTFSI mixtures with a weight ratio of 28/42/30 at 25° C. This figure compares the effect of TMPTA added systematically from 0 to 30 wt % with respect to the PEGDA6000 at 10 wt % increment. The addition of TMPTA speeds up the reaction due to the new acrylate groups available for reacting with PEGDA6000. For instance, the 28/42/30 PEGDA6000/SCN/LiTFSI composition with a TMPTA concentration of 10 wt % has an averaged reaction time of 1.10±0.26 min as compared with 7.48±0.16 min of the sample without any TMPTA. Reaction time reduces to a shorter value of 0.80±0.10 min as 30 wt % of TMPTA is incorporated. The concentration of the acrylate double bounds available for the photoreaction is a determining factor for the reaction rate of this system. Higher amount of available acrylate groups expedites the reaction towards the asymptotic equilibrium.

The area under the photoDSC curves corresponds to the total energy involved in the reaction of acrylate groups during crosslinking and is proportional to the concentration of double bonds expended in the process. If the amount of energy involved in the radical reaction of an acrylate group is approximately 80 KJ/mol, it is possible to calculate the theoretical heat released per gram during 100% conversion ($\Delta H^{r}o$) using the equation: $\Delta H^{\circ}=80^{KJ}/_{mol} \times f \times 1/M_w$, where f is functionality (2 for PEGDA and 3 for TMPTA) and $M_w$ is the molecular weight of the reactive species. Therefore, conversion α may be computed by comparing the area under the curve of the photoDSC plots (ΔH) and the theoretical heat:

$$\alpha = \frac{\Delta H}{\Delta H^{\circ}} \times 100.$$

Figure 11:
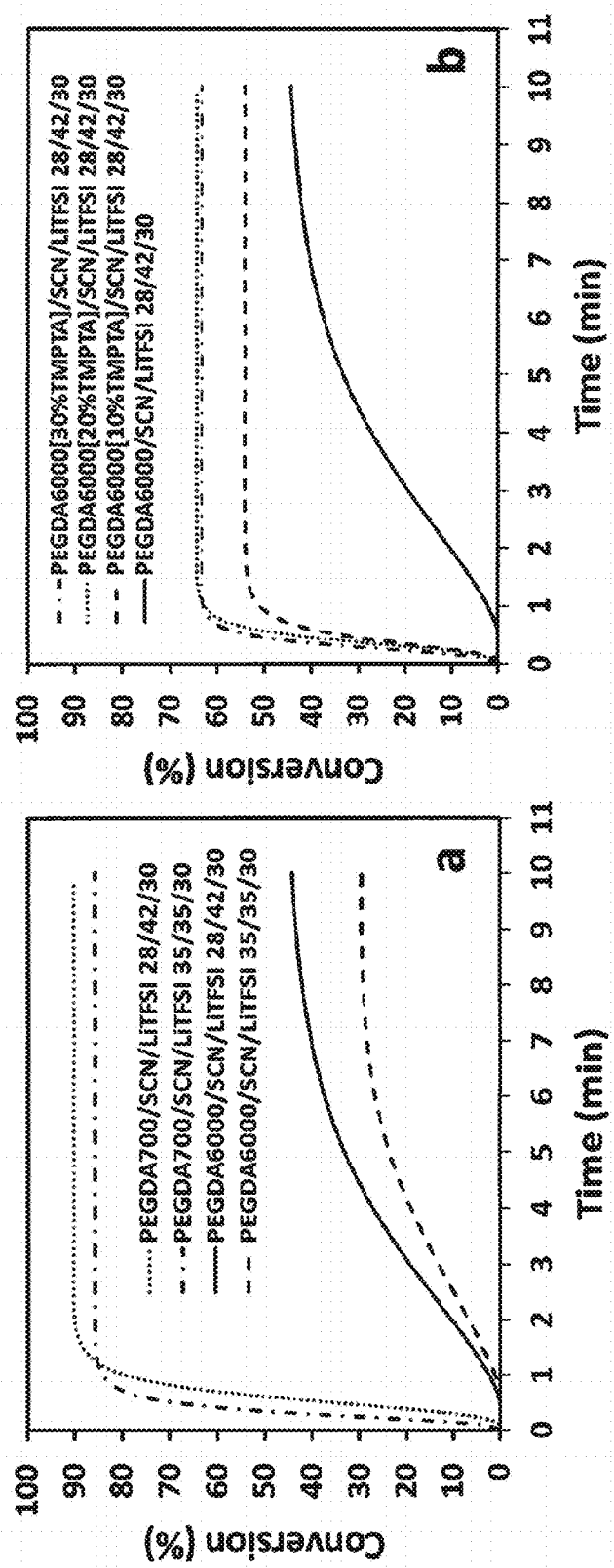
FIG. 11 is plots showing the time dependence of PEGDA conversion during continuous UV exposure at 25° C., part (a) showing the effect of PEGDA molecular weight and (b) showing the effect of TMPTA addition.

FIG. 11 shows the conversion as a function of time comparing the effect of composition and molecular weight (FIG. 11a) and the addition of TMPTA (FIG. 11b). Samples containing PEGDA700 have a total averaged conversion of 82.5±1.4% and 87.1±3.9% for 35/35/30 and 28/42/30 PEGDA700/SCN/LiTFSI, respectively. On the other hand, mixtures with higher molecular weight achieve the conversions of 31.2±1.8% and 42.4±4.0% for the 35/35/30 and 28/42/30 PEGDA6000SCN/LiTFSI compositions, respectively. The slower mobility of longer chains and the lower concentration of double bonds decrease the collision probability of PEGDA6000 molecules in the reaction. This probably explains the low conversions reached by PEGDA6000 in comparison with PEGDA 700. An important observation is that mixtures with a higher concentration of SCN yield higher conversions in blends containing either PEGDA700 or PEGDA6000. This observation may be attributed to higher mobility of polymeric chains since the presence of SCN reduces the viscosity of the mixture. An interesting feature in the higher molecular weight systems is the longer induction period at the early stages of conversion. Samples having PEGDA6000 do not start reaction immediately after UV irradiation is applied, a period of approximately 1 min is necessary to start the polymerization. Samples containing TMPTA exhibit higher conversion in comparison to the mixture with no TMPTA (see FIG. 11b). Only 10 wt % of TMPTA increases conversion up to 54%. Samples loaded with 20 and 30 wt % of TMPTA have similar conversion efficiencies around 63% suggesting a saturation limit where reaction reaches equilibrium independently of the TMPTA concentration.

Ionic Conductivity of Flexible Membranes

Figure 12:
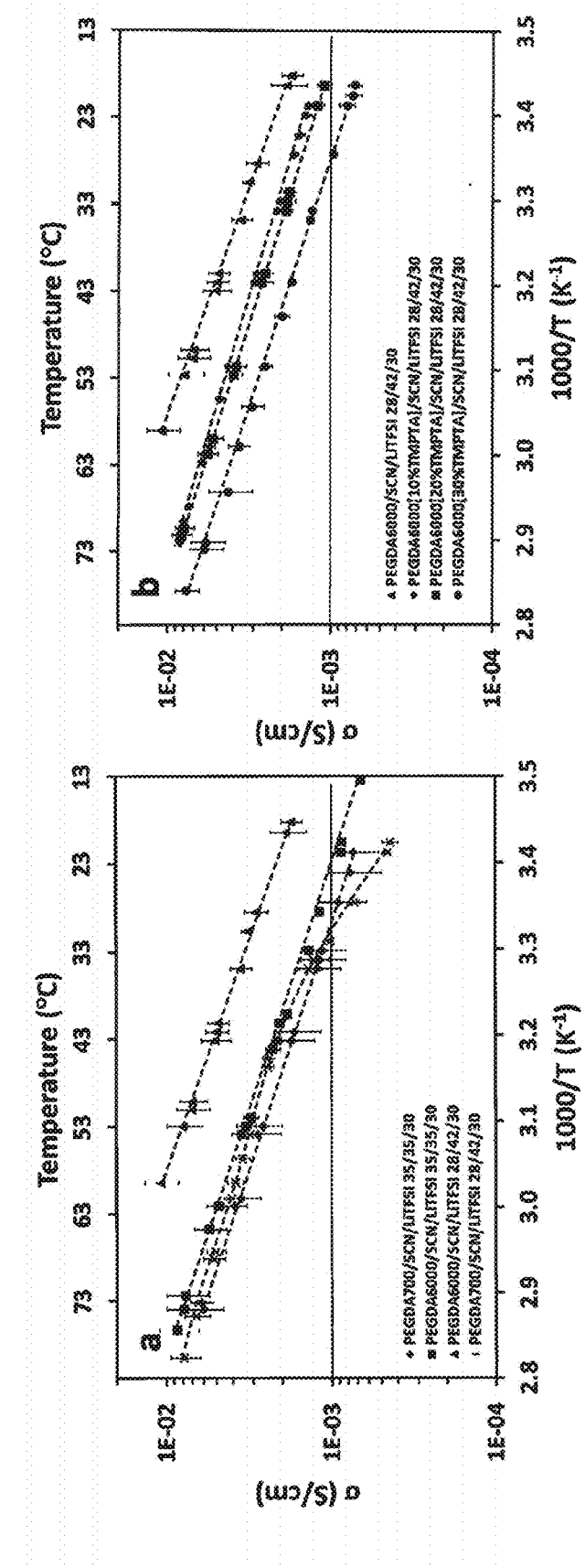
FIG. 12 is Arrhenius plots showing temperature dependence of ionic conductivity of solid electrolytes, part (a) showing the effect of PEGDA molecular weight and (b) showing the effect of TMPTA addition.

Ionic conductivity of crosslinked materials was determined using impedance spectroscopy as described in the experimental section. FIG. 12a compares the ionic conductivity of solid membranes fabricated with mixtures containing PEGDA700 or PEGDA6000 as a function of temperature. A remarkable observation is that the membranes produced with PEGDA6000 have higher conductivity relative to those containing PEGDA700 at the same concentration. The effect is more pronounced in the sample of PEGDA6000/SCN/LiTFSI with composition of 28/42/30 that exhibits room temperature conductivity of $2.88 \times 10^{-3}$ S/cm being four times higher than a mixture at the same concentration but containing PEGDA700. In addition, this membrane requires only 55° C. to reach conductivities of the order of $10^{-2}$ S/cm. Longer and more flexible PEGDA chains in isotropic configuration facilitate the motion of lithium cations among coordination points of the polyether network. Simultaneously, the presence of SCN in isotropic phase enhances the transport of lithium ions through the polymeric network. It is also possible that the lower conversion in mixtures containing PEGDA6000 is contributing to improved ion mobility through the membrane. However, conversion in 35/35/30 PEGDA6000/SCN/LiTFSI mixture is lower as compared to that of 28/42/30 PEGDA6000/SCN/LiTFSI composition, but the conductivity is still much higher in the latter. This implies that even if conversion plays any role on the conduction process it is not a crucial one as compared with the effect of SCN concentration on the ionic conductivity.

The presence of TMPTA in the 28/42/30 PEGDA6000/SCN/LiTFSI composition reduces the ionic conductivity systematically with increasing TMPTA concentration (FIG. 12b). However, the values at room temperature remain close to $10^{-3}$ S/cm. In the most extreme case, 28/42/30 PEGDA6000[30% TMPTA]/SCN/LiTFSI], the ionic room temperature conductivity is $0.98 \times 10^{-3} \pm 0.04$ S/cm. Higher concentration of TMPTA increases crosslinking density diminishing the flexibility of PEGDA strands in the network. This loss in chain mobility may restrict lithium transport trough the network.

Tensile Properties of Ionic Conductive Membranes

Figure 13:
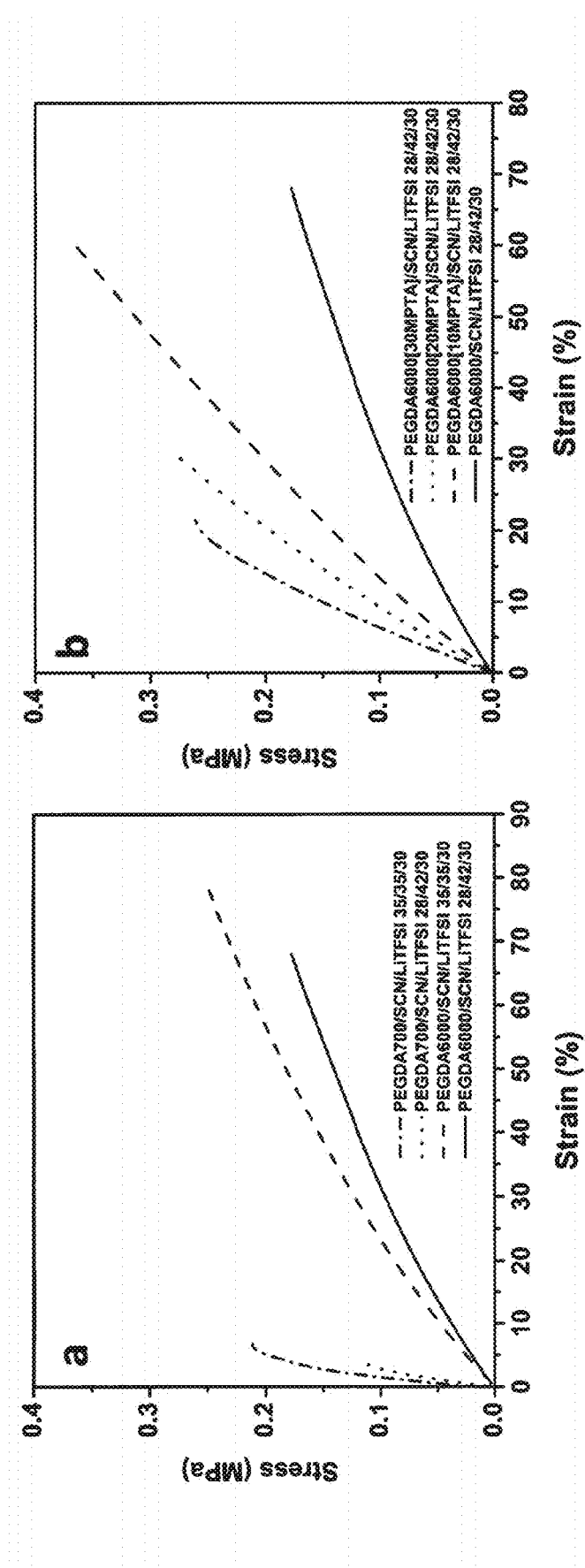
FIG. 13 is tensile curves of various cured PEGDA/SCN/LiTFSI comparing: a) PEGDA molecular weight and b) effect of TMPTA addition.

One of the ultimate goals of this example is to create not only self-standing highly conductive membranes but mechanically strong materials that can sustain external stresses. FIG. 13a shows that materials fabricated with lower molecular weight are stiffer than those with PEGDA6000. For instance, 35/35/30 and 28/42/30 PEGDA700/SCN/LiTFSI have tensile modulus of $6.59 \pm 0.23$ and $4.8 \pm 0.41$ MPa, respectively in comparison with $0.50 \pm 0.02$ and $0.36 \pm 0.03$ MPa corresponding to samples with the same concentrations but with PEGDA6000. However, materials fabricated with PEGDA6000 yield a better elongation at break of the order of 80% as compared with only 7% of samples containing PEGDA700. As expected, higher concentration of PEGDA leads to better tensile performance as can be seen in FIG. 13a where materials produced with composition 35/35/30 PEGDA/SCN/LiTFSI have higher tensile strength, modulus and elongation at break than those with a weight ratio of 28/42/30. FIG. 13b compares the effect of TMPTA on the tensile properties of membranes produced with 28/42/30 PEGDA6000/SCN/LiTFSI. The addition of 10 wt % of TMPTA with respect to PEGDA6000 considerably enhances the stiffness and tensile strength of the membrane with a minimal sacrifice of the elongation at break. Further additions of TMPTA improve systematically the modulus but increases brittleness of the membrane reducing both tensile strength and elongation at break. For better appreciation, the mechanical properties were tabulated in the following Table 1 along with other important physical and conductive properties.

TABLE 1

Comparison of different characteristics of UV cured PEGDA/SCN/LiTFSI mixtures highlighting samples with optimal mechanical and conductivity properties

| Sample name | Tensile Properties at 25° C. | | | PhotoDSC Results at 25° C. | | Conductivity Results | |
|---|---|---|---|---|---|---|---|
| | Young Modulus (MPa) | Tensile Strength (MPa) | Elongation at break (%) | Conversion (%) | Reaction time* (min) | Conductivity at 25° C. ($10^{-3}$ S/cm) | Conductivity at 55° C. ($10^{-3}$ S/cm) |
| PEGDA700/SCN/LiTFSI 35/35/30 | 6.59 ± 0.23 | 0.20 ± 0.03 | 7.7 ± 1.4 | 82.5 ± 1.4 | 0.88 ± 0.06 | 0.91 ± 0.29 | 3.13 ± 0.64 |
| PEGDA700/SCN/LiTFSI 28/42/30 | 4.8 ± 0.41 | 0.11 ± 0.03 | 5.9 ± 0.9 | 87.1 ± 3.9 | 1.18 ± 0.23 | 0.72 ± 0.05 | 3.47 ± 0.33 |
| PEGDA6000/SCN/LiTFSI 35/35/30 | 0.50 ± 0.02 | 0.24 ± 0.02 | 84.3 ± 20.0 | 31.2 ± 1.8 | 6.84 ± 0.11 | 1.20 ± 0.02 | 4.00 ± 0.64 |
| PEGDA6000/SCN/LiTFSI 28/42/30 | 0.36 ± 0.03 | 0.18 ± 0.03 | 77.5 ± 20.7 | 42.4 ± 4.0 | 7.48 ± 0.16 | 2.88 ± 0.05 | 11.24 ± 0.83 |
| PEGDA6000[10% TMPTA]/SCN/LiTFSI 28/42/30 | 0.81 ± 0.01 | 0.39 ± 0.03 | 73.6 ± 7.0 | 54.4 ± 6.1 | 1.10 ± 0.26 | 1.70 ± 0.11 | 5.04 ± 0.24 |
| PEGDA6000[20% TMPTA]/SCN/LiTFSI 28/42/30 | 1.18 ± 0.29 | 0.27 ± 0.01 | 28.2 ± 4.2 | 64.8 ± 0.4 | 0.90 ± 0.04 | 1.50 ± 0.14 | 4.75 ± 0.60 |
| PEGDA6000[30% TMPTA]/SCN/LiTFSI 28/42/30 | 1.89 ± 0.29 | 0.25 ± 0.01 | 27.6 ± 4.6 | 63.4 ± 1.7 | 0.80 ± 0.10 | 0.98 ± 0.04 | 3.05 ± 0.48 |

Table 1 summarizes the most important properties of self-standing polymeric electrolytes fabricated with various compositions. The outstanding ionic conductivity obtained by highlighted samples accompanied by the remarkable mechanical properties are tremendous advantages for a solvent free material with room temperature ionic conductivities similar or superior to traditional gel electrolytes that employ organic solvents in their formulations. An important observation is that 28/42/30 PEGDA6000/SCN/LiTFSI has a conductivity of $1.1 \times 10^{-2}$ S/cm at 55° C. which is an exceptional result considering that no organic solvent was required in the membrane fabrication and also in the electrochemical operation at elevated temperatures.

The membrane is not only self-standing, it is also stretchable, twistable and transparent. The material has a dry and homogeneous appearance but starts to absorb water after prolonged exposure to environmental humidity.

CONCLUSIONS

Membranes with conductivities of the order of $10^{-3}$ S/cm with outstanding mechanical properties were fabricated by employing high PEGDA molecular weight (Mn=6000 g/mol) and additions of TMPTA as a crosslinking density enhancer. No solvent was required during the fabrication process since the melting points of all constituents can be lowered below room temperature through eutectic strategy to create isotropic mixtures. As a result, transparent and flexible films with high elongation and stress tolerance were produced without significant detriment to ionic conductivity. In fact, it was found that increasing molecular weight of PEGDA improves considerably ionic conductivity due to the presence of longer and more flexible polyether chains. Crosslinking conversion degree as studied by means of photoDSC revealed that despite the low conversion of PEGDA6000, the effect of high molecular weight of PEGDA afforded a more flexible membrane with reputable mechanical properties. In addition, the incorporation of TMPTA not only increases conversion and reduced reaction time, but also improves tensile strength and modulus by virtue of the enhanced crosslinking density. However, the inclusion of TMPTA also reduces ionic conductivity due to decrease in network mobility.

What is claimed is:

1. A method of creating a stretchable electrolyte film comprising the steps of: mixing succinonitrile (SCN), lithium salt and crosslinkable polyether addition to form an isotropic amorphous mixture; and crosslinking the crosslinkable polyether to form a cured film, wherein the cured film remains amorphous without undergoing polymerization-induced phase separation or crystallization, wherein the cured film is conductive on the order of $10^{-3}$ S/cm.

2. The method of claim 1, wherein the lithium salt is selected from lithium bis-trifluoromethanesulfonylimide (LiTFSI), lithium bis-perfluoroethylsulfonylimide, lithium tetrafluoroborate, and lithium perchlorate and mixtures thereof.

3. The method of claim 1, wherein the crosslinkable polyether addition includes a crosslinkable polyether selected from poly(ethylene glycol)diacrylate (PEGDA), poly(ethylene glycol) dimethacrylate (PEGDMA), poly(propylene glycol) diacrylate (PPGDA), and poly(propylene glycol)dimethacrylate (PPGDMA) and mixtures thereof.

4. The method of claim 3, wherein the crosslinkable polyether has a molecular weight of from 700 or more to 6000.

5. The method of claim 1, wherein said step of mixing further includes mixing a crosslinking agent into the amorphous mixture.

6. The method of claim 5, wherein the crosslinking agent comprises from 8 weight % or more to 12 weight % or less of the crosslinkable polyether addition.

7. The method of claim 5, wherein the crosslinking agent is a molecule having multiple crosslinking sites.

8. The method of claim 1, further comprising the step of mixing an initiator as part of the amorphous mixture.

9. The method of claim 8, wherein said step of crosslinking includes activating the initiator.

10. The method of claim 1, wherein the amorphous mixture is devoid of solvent.

11. The method of claim 1, wherein the lithium salt is LiTFSI, the crosslinkable polyether addition includes PEGDA, and the amorphous mixture includes from 40 to 50 parts the polyether addition, from 40 to 50 parts SCN, and 30 parts LiTFSI.

12. The method of claim 11, wherein the polyether addition further includes a crosslinking agent, and the crosslinking agent makes up from greater than 0 to 30 wt % or less of the polyether addition.

13. The method of claim 12, wherein the crosslinking agent is trimethylolpropane triacrylate (TMPTA) and makes up 10 wt % of the crosslinkable polyether addition, and the amorphous mixture includes 28 parts by weight polyether addition, 42 parts by weight SCN, and 30 parts by weight LiTFSI.

14. A solid, stretchable electrolyte comprising:
a mixture of succinonitrile (SCN), lithium salt and crosslinkable polyether, wherein the crosslinkable polyether is crosslinked and the mixture is an isotropic amorphous mixture and is conductive on the order of $10^{-3}$ S/cm.

15. The electrolyte of claim 14, wherein the lithium salt is selected from lithium bis-trifluoromethanesulfonylimide (LiTFSI), lithium bis-perfluoroethylsulfonylimide, lithium tetrafluoroborate, and lithium perchlorate and mixtures thereof.

16. The electrolyte of claim 15, wherein the crosslinkable polyether addition includes a crosslinkable polyether selected from poly(ethylene glycol)diacrylate (PEGDA), poly(ethylene glycol)dimethacrylate (PEGDMA), poly(propylene glycol)diacrylate (PPGDA), and poly(propylene glycol)dimethacrylate (PPGDMA) and mixtures thereof.

17. The electrolyte of claim 14, wherein the electrolyte is devoid of solvent.

18. The electrolyte of claim 14, wherein the lithium salt is LiTFSI, the crosslinkable polyether is a PEGDA addition, and the mixture includes from 20 to 30 parts by weight of the PEGDA addition, from 40 to 50 parts by weight SCN, and 30 parts by weight LiTFSI.

19. The electrolyte of claim 18, wherein the PEGDA addition further comprises a crosslinking agent and wherein the crosslinking agent is from 10 to 30 parts by weight of the PEDGA addition.

* * * * *